US012792667B1

(12) United States Patent
Mogill

(10) Patent No.: US 12,792,667 B1
(45) Date of Patent: Nov. 10, 2026

(54) APPARATUS FOR AND METHOD OF VECTOR-BASED DATA MAPPING

(71) Applicant: Crisp, Inc., Atlanta, GA (US)

(72) Inventor: Michael Mogill, Atlanta, GA (US)

(73) Assignee: Crisp, Inc., Atlanta, GA (US)

( * ) Notice: Subject to any disclaimer, the term of this patent is extended or adjusted under 35 U.S.C. 154(b) by 0 days.

(21) Appl. No.: 19/418,700

(22) Filed: Dec. 12, 2025

(51) Int. Cl.

| | |
|---|---|
| ***G06F 16/90*** | (2019.01) |
| ***G06F 16/901*** | (2019.01) |
| ***G06F 16/906*** | (2019.01) |
| ***G06F 18/22*** | (2023.01) |
| ***G06N 3/0475*** | (2023.01) |
| ***G06N 3/084*** | (2023.01) |

(52) U.S. Cl.
CPC ........ *G06F 16/9024* (2019.01); *G06F 16/906* (2019.01); *G06F 18/22* (2023.01); *G06N 3/0475* (2023.01); *G06N 3/084* (2013.01)

(58) Field of Classification Search
None
See application file for complete search history.

(56) References Cited

U.S. PATENT DOCUMENTS 11,238,410 B1 2/2022 Wright
12,314,304 B1 * 5/2025 Bachman ............ G06F 16/3329
12,373,475 B1 * 7/2025 Cappetta ............. G06F 16/3334
2019/0318315 A1 10/2019 Clark-Lindh et al.
2023/0351333 A1 11/2023 Menke et al.
2024/0256840 A1 * 8/2024 Song .................... G06N 3/0475
2024/0256998 A1 8/2024 Karl
2025/0253016 A1 * 8/2025 Hafen ................... G06F 16/248
2025/0335876 A1 * 10/2025 Light ................. G06Q 10/1053
2025/0384341 A1 * 12/2025 Cella ....................... G06N 20/00
2026/0010537 A1 * 1/2026 Alperin ............. G06F 16/24575
2026/0018251 A1 * 1/2026 Bachman ................. G06N 7/01
2026/0050617 A1 * 2/2026 Busany ............... G06F 16/3329
2026/0094161 A1 * 4/2026 Takacs ............... G06Q 20/4016

* cited by examiner

*Primary Examiner* — Eliyah S. Harper
(74) *Attorney, Agent, or Firm* — CALDWELL LLC

(57) ABSTRACT

An apparatus and method for vector-based data mapping are disclosed. The apparatus includes at least a processor, and a memory configuring the at least a processor to receive a first dataset including candidate data associated with a plurality of candidates, and retrieve a second dataset from one or more data sources, wherein the second dataset includes role data. The processor is further configured to tokenize the role data into a structured graph including a plurality of graph nodes and at least one relationship edge between the plurality of graph nodes, generate an embedding representation of the candidate data, determine, for each candidate of the plurality of candidates, an alignment score by determining vector similarity between the embedding representation and the structured graph, generate a data output as a function of the alignment scores of the plurality of candidates, and generate a graphical user interface including the data output.

20 Claims, 7 Drawing Sheets

APPARATUS FOR AND METHOD OF VECTOR-BASED DATA MAPPING

FIELD OF THE INVENTION

The present invention generally relates to the field of artificial intelligence ("AI" leveraged data mapping. In particular, the present invention is directed to an apparatus for and method of vector-based data mapping.

BACKGROUND

Modern computing systems frequently require efficient data mapping techniques to represent relationships between heterogeneous datasets. Conventional data mapping architectures are generally limited to static mapping frameworks that rely on predefined schemas or rigid data correspondence rules. These approaches are technically insufficient for handling unstructured or semi-structured data. Accordingly, there exists a need for improved data mapping technologies.

SUMMARY OF THE DISCLOSURE

In some aspects, the techniques described herein relate to an apparatus for vector-based data mapping, the apparatus including at least a processor, and a memory communicatively connected to the at least a processor, wherein the memory contains instructions configuring the at least a processor to receive a first dataset including candidate data associated with a plurality of candidates, retrieve a second dataset from one or more data sources, wherein the second dataset includes role data, tokenize the role data into a structured graph including a plurality of graph nodes and at least one relationship edge between the plurality of graph nodes, generate an embedding representation of the candidate data, determine, for each candidate of the plurality of candidates, an alignment score by determining vector similarity between the embedding representation and the structured graph, wherein determining the alignment score includes applying one or more weighting functions to the scaled alignment scores of the plurality of candidates as a function of a critical value associated with the plurality of graph nodes, wherein applying the one or more weighting functions includes scaling the scaled alignment scores in proportion to the one or more weighting functions, generate a data output as a function of the scaled alignment scores of the plurality of candidates, wherein the data output includes a ranked list of the plurality of candidates and corresponding breakdown texts, and generate a graphical user interface including the data output.

In some aspects, the techniques described herein relate to a method of vector-based data mapping, the method including receiving, using at least a processor, a first dataset including candidate data associated with a plurality of candidates, retrieving, using the at least a processor, a second dataset from one or more data sources, wherein the second dataset includes role data, tokenizing, using the at least a processor, the role data into a structured graph including a plurality of graph nodes and at least one relationship edge between the plurality of graph nodes, generating, using the at least a processor, an embedding representation of the candidate data, determining, using the at least a processor, an alignment score for each candidate of the plurality of candidates by determining vector similarity between the embedding representation and the structured graph, wherein determining the alignment score includes applying one or more weighting functions to the scaled alignment scores of the plurality of candidates as a function of a critical value associated with the plurality of graph nodes, wherein applying the one or more weighting functions includes scaling the scaled alignment scores in proportion to the one or more weighting functions, generating, using the at least a processor, a data output as a function of the scaled alignment scores of the plurality of candidates, wherein the data output includes a ranked list of the plurality of candidates and corresponding breakdown texts, and generating, using the at least a processor, a graphical user interface including the data output.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to apparatuses for and methods of vector-based data mapping, the apparatus including at least a processor, and a memory communicatively connected to the at least a processor, wherein the memory contains instructions configuring the at least a processor to receive a first dataset including candidate data associated with a plurality of candidates, retrieve a second dataset from one or more data sources, wherein the second dataset includes role data, tokenize the role data into a structured graph including a plurality of graph nodes and at least one relationship edge between the plurality of graph nodes, generate an embedding representation of the candidate data, determine, for each candidate of the plurality of candidates, an alignment score by determining vector similarity between the embedding representation and the structured graph, wherein determining the alignment score includes applying one or more weighting functions to the scaled alignment scores of the plurality of candidates as a function of a critical value associated with the plurality of graph nodes, wherein applying the one or more weighting functions includes scaling the scaled alignment scores in proportion to the one or more weighting functions, generate a data output as a function of the scaled alignment scores of the plurality of candidates, wherein the data output includes a ranked list of the plurality of candidates and corresponding breakdown texts, and generate a graphical user interface including the data output.

In some aspects of the present disclosure relates to a vector-based data mapping system configured to align role descriptions with candidate competencies through vector similarity analysis. In some embodiments, role descriptions may be tokenized into structured graphs comprising a plurality of graph nodes representing skills and relational dependencies, while candidate resumes may be converted into embedding representations generated by a transformer-based natural language processing model. Processor may be configured to compute alignment scores across multiple evaluation dimensions, including technical skill correspondence, experiential relevance, and contextual or cultural compatibility. In some embodiments, one or more weighting functions may be applied to the computed alignment scores as a function of critical values associated with specific skill nodes, such that highly significant competencies exert greater influence on the resulting match score than secondary attributes. The disclosed system may be configured to automatically generate ranked candidate shortlists and corresponding interpretive breakdowns, thereby providing a transparent and technically rigorous framework for evaluating candidate-to-role alignment.

Exemplary embodiments illustrating aspects of the present disclosure are described below in the context of several specific examples.

Figure 1:
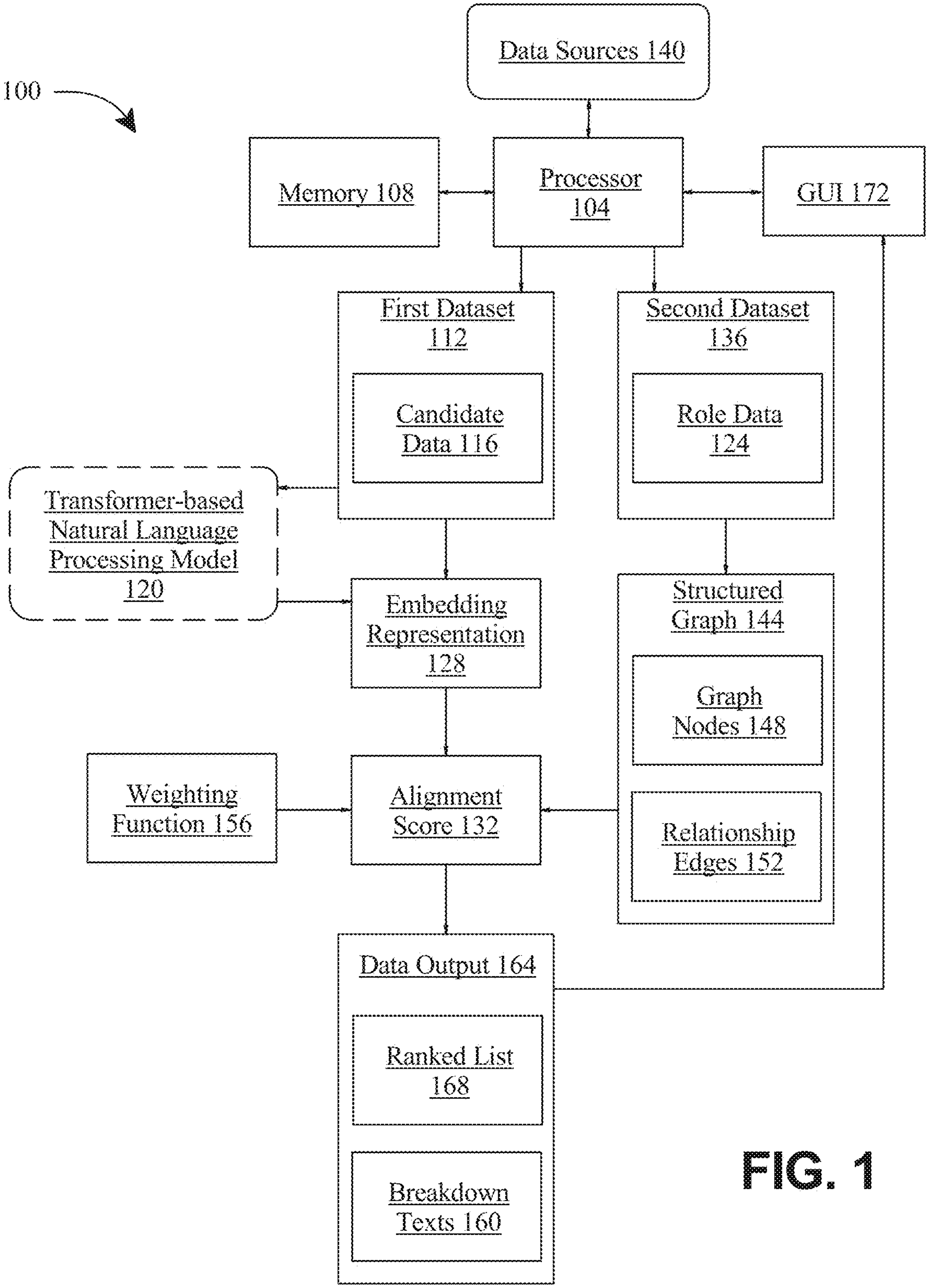
FIG. 1 illustrates a block diagram of an exemplary apparatus for vector-based data mapping.

Referring now to FIG. 1, an exemplary embodiment of apparatus 100 for vector-based data mapping is illustrated. Apparatus 100 may include circuitry such as without limitation a processor 104 communicatively connected to a memory 108; for instance, circuitry may include and/or be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, memory 108 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor may access the information from primary memory.

With continued reference to FIG. 1, as used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 is configured to receive a first dataset 112. For the purposes of this disclosure, a "first dataset" is input data representing candidate information associated with a plurality of candidates. The first dataset 112 may include text-based and numerical data elements that characterize skills, experience levels, education histories, and professional achievements. As a non-limiting example, the first dataset 112 may include a collection of candidate resumes, digital profiles, or structured recruitment database records stored in memory. In some embodiments, processor 104 may be configured to normalize the first dataset 112 into a uniform format by applying text preprocessing operations including tokenization, sentence segmentation, and stop-word removal, thereby preparing the data for feature extraction.

With continued reference to FIG. 1, first dataset 112 includes candidate data 116. For the purposes of this disclosure, "candidate data" is digital information describing one or more human candidates, wherein each candidate record includes textual, numerical, categorical, or multimedia elements that together represent the professional profile of an individual. Candidate data 116 may include data elements reflecting skills, qualifications, education, employment history, certifications, and other competency indicators relevant to professional matching or recruitment. Each element of candidate data 116 is stored as structured or unstructured information retrievable from local or remote storage systems. As a non-limiting example, candidate data 116 may include textual resume documents in plain text, PDF, or XML format, digital profile data retrieved from enterprise recruitment databases, or structured human resources data in relational tables. Candidate data 116 may also include derived data fields such as total years of experience, prior position titles, industry specialization, and semantic extractions of skill statements identified within a candidate's textual materials.

With continued reference to FIG. 1, for the purposes of this disclosure, "candidates" are entities representing human individuals whose professional qualifications, experiences, and skills are evaluated for alignment with one or more role descriptions. Each candidate may be represented within apparatus 100 as a digital entity encapsulated through candidate data 116, which includes descriptive, behavioral, and historical features derived from various data sources. As a non-limiting example, candidates may include attorneys, paralegals, or legal researchers whose professional credentials are stored in electronic databases, resume repositories, or recruitment systems. Each candidate may be uniquely identifiable within the system through one or more identifiers such as an internal candidate ID, profile reference, or encoded embedding vector generated by processor 104.

With continued reference to FIG. 1, in some embodiments, processor 104 may be configured to interpret candidates as multi-dimensional data objects, each composed of a set of attributes describing the candidate's professional and contextual characteristics. These attributes may include personal identifiers, educational background, years of practice, technical skills, language proficiencies, jurisdictional licenses, and prior employment records. Processor 104 may be configured to extract and encode such attributes into machine-readable format to facilitate computational analysis by downstream AI/ML models. For the purposes of this disclosure, "candidate attributes" are feature-level representations of candidates derived from candidate data 116. As a non-limiting example, candidate attributes may include explicit skill mentions such as "intellectual property litigation," numerical features such as "10 years of post-qualification experience," or categorical attributes such as "corporate law specialization."

With continued reference to FIG. 1, in some embodiments, processor 104 may be configured to normalize candidate data 116 into a machine-readable schema. Normalization may include removing formatting artifacts, performing tokenization, segmenting sentences, lemmatizing words, and encoding categorical variables into vector form. Processor 104 may further extract latent semantic representations of candidate data 116 using a natural language encoder trained to identify skill expressions, action verbs, and contextual qualifiers from text segments, for the purposes of this disclosure, a "skill expression" is a textual or linguistic phrase extracted from role data that denotes a particular ability, qualification, or technical competency relevant to a role or task. A skill expression is not limited to single-word terms but may include multi-word phrases or contextualized constructs that describe a specific expertise, process, or domain-relevant capability. As a non-limiting example, a skill expression may include phrases such as "neural network optimization," "data pipeline automation," or "project risk assessment," each conveying a composite meaning beyond the sum of individual words. For the purposes of this disclosure, "normalized candidate data" is preprocessed candidate data prepared for downstream modeling. As a non-limiting example, normalized candidate data 116 may include tokens representing extracted skills such as "litigation," "contract drafting," or "mergers and acquisitions," each token being linked to context features such as duration of practice, seniority level, or task frequency. In some embodiments, processor 104 may be configured to identify skill expressions by performing token-level segmentation and dependency parsing on role data 124 using a natural language processing model. In some embodiments, identification of skill expressions may include recognizing both explicit and implicit forms of skills, for instance, distinguishing between directly stated skills ("Python programming") and contextual equivalents ("developed algorithms using Python"). In some embodiments, skill expressions may serve as linguistic anchors from which graph nodes 148 are derived during the tokenization process, enabling the construction of structured graph 144 representations that preserve semantic relationships among the extracted skills.

With continued reference to FIG. 1, candidate data 116 may serve as an input to the transformer-based natural language processing model 120. In some embodiments, processor 104 may input candidate data 116 in textual sequence form to generate an embedding representation 128. The embedding representation 128 numerically encodes the meaning of the candidate data 116 such that candidates possessing similar professional competencies occupy proximate positions within a multidimensional vector space. For the purposes of this disclosure, the input features of candidate data 116 may include word tokens, sentence-level embeddings, and metadata embeddings corresponding to domain identifiers such as "practice area," "jurisdiction," or "role title." The output features of candidate data 116, once processed through the transformer-based natural language processing model 120, include contextualized embedding vectors representing semantic associations between the candidate's described skills and the corresponding requirements defined in the role data 124. As a non-limiting example, a first instance of candidate data 116 describing "contract negotiation for international clients" may be encoded by processor 104 into an embedding vector proximate to vectors representing "cross-border contract drafting" or "transactional advisory." Conversely, candidate data 116 describing "courtroom advocacy and motion practice" may be encoded into a distinct cluster corresponding to litigation-oriented competencies.

With continued reference to FIG. 1, in some embodiments, processor 104 may augment candidate data 116 by linking external data sources. External augmentation may include verification datasets such as credential registries or public legal filings to provide richer context to each candidate record. For the purposes of this disclosure, "augmented candidate data" is candidate data that includes additional external or inferred attributes supplementing the original profile information. As a non-limiting example, augmented candidate data 116 may include inferred language proficiency levels, publication records, or client representation counts extracted from linked metadata sources.

With continued reference to FIG. 1, candidate data 116 may be stored in an indexed repository accessible to processor 104 for real-time retrieval during vector similarity computations. Processor 104 may be configured to maintain referential integrity between candidate data 116, its corresponding embedding representation 128, and the computed alignment score 132 to ensure accurate traceability of matching results.

With continued reference to FIG. 1, processor 104 is further configured to retrieve a second dataset 136 from one or more data sources. For the purposes of this disclosure, a "second dataset" is input data representing role-related information including job descriptions, task specifications, or professional requirement documents. As a non-limiting example, the second dataset 136 may include law firm role descriptions stored in a database or external data repository. In some embodiments, processor 104 may be configured to access the second dataset 136 through an application programming interface or secure data pipeline. Processor 104 May then extract linguistic features from the second dataset 136 for downstream analysis.

With continued reference to FIG. 1, second dataset 136 includes role data 124. For the purposes of this disclosure, "role data" is digital information describing professional positions, job responsibilities, or functional requirements that define a target role against which one or more candidates are evaluated. In some embodiments, role data 124 may be a structured or unstructured dataset including textual content, categorical attributes, and numerical parameters representing the qualifications, skills, and experience criteria associated with a particular job or professional role. As a non-limiting example, role data 124 may include a job description document, an internally defined role profile, or a standardized occupational taxonomy record. Each instance of role data 124 may include sections identifying required skills, years of experience, practice areas, or cultural attributes.

With continued reference to FIG. 1, processor 104 may be configured to retrieve information (e.g., second dataset 136, role data 124, first dataset 112, candidate data 116, and the like) from one or more data sources 140. For the purposes of this disclosure, "data source" is a computing system, repository, or storage environment that provides structured or unstructured digital information retrievable by apparatus 100 for analysis, training, or inference operations. For the purposes of this disclosure, data source 140 may be characterized by its capacity to transmit data to processor 104 through one or more communication interfaces. Data source 140 is not limited to a single type of system and includes any form of memory structure, network service, or external content provider configured to deliver datasets relevant to the operation of apparatus 100. As a non-limiting example, data source 140 may include a local enterprise storage server, a cloud-based applicant tracking system, a relational database, or a text-based repository of role descriptions and candidate records. In some embodiments, data source 140 may include a public or private data stream providing professional profiles, legal job postings, or domain-specific corpora used for natural language model training.

With continued reference to FIG. 1, in some embodiments, processor 104 may be configured to establish a communication session with each data source 140 through an input/output interface. In some embodiments, processor 104 may transmit a data retrieval instruction identifying a dataset type such as role data 124, candidate data 116, or auxiliary training data. In some embodiments, data source 140 may respond with a data packet or stream formatted in a structured markup representation, such as JSON or XML, that processor 104 converts into an internal data schema compatible with the apparatus 100. For the purposes of this disclosure, "retrieved dataset" is the collection of data obtained from a data source as a result of a retrieval operation executed by processor 104. As a non-limiting example, processor 104 may retrieve role data 124 from a firm's internal recruitment database and candidate data 116 from a separate resume management platform, where each data source 140 provides its own authentication, transmission, and update protocol.

With continued reference to FIG. 1, in some embodiments, processor 104 may be configured to monitor data quality and latency associated with each data source 140. In some embodiments, processor 104 may execute a verification procedure to ensure data integrity by performing checksum validation, timestamp comparison, or schema matching prior to incorporating retrieved dataset into downstream models. In some embodiments, processor 104 may be configured to dynamically weight or select among multiple data sources 140 based on reliability metrics. In some embodiments, processor 104 may assign a higher trust value to a curated enterprise database than to a publicly accessible data stream, ensuring that data incorporated into transformer-based natural language processing model 120 originates from validated origins.

With continued reference to FIG. 1, in some embodiments, processor 104 may be configured to use data source 140 to supply training data to one or more AI/ML models within apparatus 100. As a non-limiting example, data source 140 may include a corpus of historical job descriptions and successful placement records used to train the transformer-based natural language processing model 120 and the priority machine learning model. Processor 104 may continuously retrieve updated examples from data source 140 to retrain or fine-tune model parameters using stochastic gradient descent operations.

With continued reference to FIG. 1, in some embodiments, processor 104 may be configured to perform feature extraction directly from raw data retrieved from data source 140. In some embodiments, processor 104 may convert raw text, numerical fields, or categorical metadata into structured representations suitable for downstream processing, including token sequences for language models and graph elements for structured graph 144 generation. As a non-limiting example, processor 104 may extract textual skill expressions such as "contract negotiation" or "litigation management" from unstructured documents retrieved from data source 140 and encode those expressions as graph nodes within structured graph 144.

With continued reference to FIG. 1, in some embodiments, data source 140 may also serve as a feedback input for adaptive model retraining. In some embodiments, processor 104 may transmit newly computed alignment scores 132 and candidate rankings to data source 140 for storage and later retrieve them to construct labeled datasets representing historical matching outcomes. As a non-limiting example, processor 104 may retrieve feedback data indicating that a particular candidate was selected for a given role, thereby labeling prior embedding representations 128 and alignment scores 132 for use in retraining the priority machine learning model.

With continued reference to FIG. 1, in some embodiments, processor 104 may be configured to secure all data exchanges with data source 140 through encryption and authentication layers. In some embodiments, processor 104 may employ cryptographic protocols to prevent unauthorized data modification during transmission between apparatus 100 and external data sources 140. In some embodiments, processor 104 may be configured to periodically update its internal data cache with refreshed content from data source 140 to ensure current and representative datasets for role and candidate evaluations.

With continued reference to FIG. 1, processor 104 is configured to tokenize role data 124 into structured graph 144. In some cases, processor 104 may be configured to convert the second dataset 136 into a structured graph 144. For the purposes of this disclosure, a "structured graph" is a data structure including a plurality of graph nodes and at least one relationship edge connecting those graph nodes. For the purposes of this disclosure, "graph node" is a data element within structured graph 144 that represents an individual concept, skill, or attribute extracted from role data 124. Each graph node 148 is a unique entity containing a feature vector or symbolic identifier corresponding to a discrete professional competency, requirement, or contextual descriptor. For the purposes of this disclosure, "relationship edge" is a data connection between two or more graph nodes 148 that represents a contextual, hierarchical, or statistical association between the respective skills or attributes represented by the connected nodes. Each graph node may represent an identified skill or competency term within the role data. Each relationship edge may represent an associative or hierarchical relationship derived from linguistic context or co-occurrence statistics. As a non-limiting example, a role description including the terms "contract negotiation" and "dispute resolution" may yield graph nodes representing each skill and an edge reflecting their co-occurrence frequency within the same textual segment. In some embodiments, processor 104 may apply a natural language parsing algorithm to the second dataset 136 to identify hierarchical dependencies between skill categories, such as associating "commercial litigation" as a subcategory of "litigation."

With continued reference to FIG. 1, for the purposes of this disclosure, "tokenizing" is the process of decomposing unstructured or semi-structured text data into discrete, machine-readable linguistic or semantic units, referred to herein as tokens. Tokens may represent meaningful entities such as words, phrases, or recognized domain concepts. In some cases, processor 104 may be configured to identify at least one skill term from role data 124 using a language processing module. For the purposes of this disclosure, "skill term" is a linguistic or semantic element representing a specific ability, qualification, or domain expertise referenced in role data. As a non-limiting example, a skill term may include "contract negotiation," "financial modeling," "machine learning," "trial advocacy," or similar professional competencies depending on the industry represented by role data 124. In some embodiments, language processing module may include a transformer-based natural language processing model 120 trained on a corpus of annotated job descriptions and skill taxonomies to detect skill terms through part-of-speech tagging, dependency parsing, and named entity recognition.

With continued reference to FIG. 1, in some embodiments, language processing module may be configured to utilize one or more pretrained models such as BERT, ROBERTa, or domain-specific skill extraction transformers, which may be fine-tuned using labeled training data containing examples of job descriptions annotated with their corresponding skill terms. In some embodiments, the training data for the language processing module may include textual corpora derived from professional databases, resume repositories, or standardized occupational taxonomies, each labeled with the corresponding domain-relevant skill expressions. Processor 104 may be configured to iteratively optimize model parameters using stochastic gradient descent to minimize classification error between predicted and ground-truth skill term annotations.

With continued reference to FIG. 1, in some embodiments, processor 104 may use a language processing module to find a keyword. The language processing module may be configured to extract, from the one or more documents, one or more words. One or more words may include, without limitation, strings of one or more characters, including without limitation any sequence or sequences of letters, numbers, punctuation, diacritic marks, symbols, formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams," where all sequences of n consecutive characters are considered. Any or all possible sequences of tokens or words may be stored as "chains," for example for use as a Markov chain or Hidden Markov Model.

With continued reference to FIG. 1, language processing module may operate to produce a language processing model. Language processing model may include a program automatically generated by processor 104 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, language processing module may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents to generate associations between language elements in a language processing module may then use such associations to analyze words extracted from one or more documents and determine that the one or more documents indicate significance of a category. In an embodiment, language module and/or processor 104 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, processor 104 may automatically obtain the document using such an identifier, for instance by submitting a request to a database or compendium of documents such as JSTOR as provided by Ithaka Harbors, Inc. of New York.

With continued reference to FIG. 1, in some embodiments, processor 104 may be configured to associate each identified skill term with at least one contextual modifier. For the purposes of this disclosure, "contextual modifier" is a linguistic or semantic element that refines the meaning, scope, or intensity of a corresponding skill term within a specific role context. As a non-limiting example, contextual modifier may include adjectives or phrases that modify the skill term's usage-such as "advanced negotiation," "cross-border compliance expertise," or "senior-level management experience." In some embodiments, processor 104 may employ a dependency parsing algorithm or attention-weight analysis from the language processing module to identify syntactic modifiers directly linked to each skill term, thereby establishing semantic relationships between skill terms and contextual modifiers.

With continued reference to FIG. 1, in some embodiments, processor 104 may be configured to generate at least one relationship edge 152 between a plurality of graph nodes 148 as a function of co-occurrence frequency between one or more skill categories. For the purposes of this disclosure, "co-occurrence frequency" is a statistical parameter quantifying how often two or more skill expressions classified under distinct or overlapping skill categories appear in proximity within the same role data 124. In some embodiments, processor 104 may be configured to compute co-occurrence frequency by performing statistical analysis on tokenized segments of role data 124, where each segment may include a sentence, list element, or paragraph describing related qualifications or competencies. Processor 104 may be configured to identify pairs or groups of skill expressions that occur together within these segments and increment a co-occurrence count each time such associations are observed.

With continued reference to FIG. 1, in some embodiments, processor 104 may be configured to compile these co-occurrence counts into a co-occurrence matrix that captures the frequency of joint appearances across all skill categories. For the purposes of this disclosure, a "skill category" is a labeled classification representing a grouping of related skill expressions that share a common thematic, functional, or domain-specific characteristic. Each cell in this matrix may represent the total observed frequency with which a pair of skill categories appear together in the same contextual region of the role data 124. Processor 104 may be configured to normalize these frequencies using statistical weighting schemes such as pointwise mutual information (PMI), term frequency-inverse document frequency (TF-IDF), or log-likelihood ratio normalization, to ensure that common but non-informative skill pairings are de-emphasized while meaningful correlations are amplified.

With continued reference to FIG. 1, in some embodiments, processor 104 may be configured to apply a probabilistic thresholding operation on the normalized co-occurrence frequency values to exclude associations that fall below a predefined confidence threshold. In some embodiments, this threshold may be dynamically updated based on observed variance within role data 124 from different sources, allowing apparatus 100 to adapt to changing linguistic or occupational patterns. Processor 104 may also be configured to assign relative weights to pairs of skill categories according to their normalized co-occurrence frequency, where stronger associations correspond to higher weights and weaker associations correspond to lower weights.

With continued reference to FIG. 1, in some embodiments, processor 104 may be configured to encode the weighted co-occurrence values into the structured graph 144 such that frequently co-occurring skill categories are positioned closer within a shared semantic space. This configuration may allow apparatus 100 to capture implicit relationships among professional competencies and to reflect those relationships within the topological structure of structured graph 144. The resulting topology may support more contextually accurate candidate-role matching by emphasizing semantically related skill categories that tend to appear together within role data 124.

With continued reference to FIG. 1, in some embodiments, processor 104 may be configured to continuously update co-occurrence frequency values and corresponding graph connections as new role data 124 is introduced. Such dynamic adjustment may ensure that structured graph 144 evolves alongside emerging industry terminology and evolving job functions, thereby maintaining alignment between stored graph structures and real-world semantic relationships derived from up-to-date role data 124.

With continued reference to FIG. 1, in some embodiments, processor 104 may be configured to generate at least one relationship edge 152 between a plurality of graph nodes 148 as a function of hierarchical dependency between one or more skill categories. For the purposes of this disclosure, "hierarchical dependency" is a structured relationship indicating a parent-child or dependency association between two or more skill categories. As a non-limiting example, one skill category may represent a prerequisite, foundational, or enabling competency for another. In some embodiments, processor 104 may be configured to infer hierarchical dependency based on linguistic and syntactic cues extracted from role data 124, such as comparative modifiers ("advanced," "basic," "lead"), dependency verbs ("requires," "builds upon"), or ordinal expressions ("level 1," "level 2," "senior," "junior").

With continued reference to FIG. 1, in some embodiments, processor 104 may be configured to utilize a hierarchical clustering algorithm or dependency parsing framework to group skill expressions into multi-level structures according to their conceptual depth or complexity. As a non-limiting example, processor 104 may identify "machine learning" as a parent skill category and "neural network optimization" as a child category based on syntactic dependency patterns and co-occurrence analysis in the underlying text. In some embodiments, these hierarchical associations may be encoded within the structured graph 144 by generating directed relationship edges, where each edge may represent a directional dependency from a foundational skill node to a more advanced or specialized node.

With continued reference to FIG. 1, in some embodiments, processor 104 may be configured to assign weighted values to hierarchical dependencies according to the strength of contextual relationships observed in role data 124. For example, the dependency between "data analysis" and "statistical modeling" may be assigned a higher weight if these terms frequently co-occur in structured patterns where one is described as a requirement or precursor to the other. The magnitude of these weights may represent the hierarchical depth, such that higher weights correspond to more direct dependencies or prerequisite relationships.

With continued reference to FIG. 1, in some embodiments, processor 104 may be configured to augment hierarchical dependency detection with external knowledge bases or ontological structures, such as occupational taxonomies or standardized skill ontologies. In such embodiments, processor 104 may cross-reference extracted skill categories with entries in external taxonomies to confirm and refine hierarchical ordering. This cross-validation may enhance the precision of the hierarchical graph structure, ensuring that each relationship edge 152 accurately reflects real-world dependencies among technical, cognitive, or functional skill domains.

With continued reference to FIG. 1, in some embodiments, hierarchical dependency may influence the spatial organization of nodes within the structured graph 144, such that higher-level skill categories occupy parent positions and subordinate categories branch out as dependent child nodes. Processor 104 may be configured to maintain this structural hierarchy dynamically, updating dependency chains as new skill categories are added or as existing relationships evolve over time. This hierarchical encoding may enable apparatus 100 to generate interpretable and scalable graph representations that mirror real-world competency frameworks, thereby improving the accuracy and explainability of downstream processes such as candidate-role matching and skill alignment evaluation.

With continued reference to FIG. 1, in some embodiments, processor 104 is configured to represent each skill term and its associated contextual modifier as a graph node 148 within structured graph 144. For the purposes of this disclosure, "graph node" is a data entity representing an atomic unit of semantic meaning derived from role data 124, and "structured graph" is a data representation structure comprising interconnected graph nodes 148 that encode hierarchical and relational dependencies between identified skill terms and contextual modifiers. In some embodiments, each contextual modifier may be embedded as an attribute of the corresponding graph node 148 or as an independent node connected via a relationship edge 152 representing a modifier relationship.

With continued reference to FIG. 1, in some embodiments, processor 104 may encode each skill term and contextual modifier into vector embeddings using a contextual embedding model such as Word2Vec, FastText, or Sentence-BERT, thereby transforming linguistic components into high-dimensional numerical representations suitable for computational comparison. The embedding representations of skill terms and contextual modifiers may be concatenated or merged using a weighted attention mechanism that prioritizes contextual modifiers exhibiting higher syntactic dependency weights or higher attention scores relative to the base skill term. In some embodiments, this allows processor 104 to construct a role embedding that faithfully preserves nuanced meaning from role data 124, enabling subsequent alignment scoring against candidate embeddings.

With continued reference to FIG. 1, in some embodiments, processor 104 may be configured to update structured graph 144 dynamically as additional role data 124 or contextual information becomes available. As a non-limiting example, when new skill terms or contextual modifiers are detected in subsequent role descriptions, processor 104 may expand structured graph 144 by generating new graph nodes 148 and relationship edges while recalibrating vector weights to maintain semantic consistency across the dataset. This continuous adaptation enables apparatus 100 to learn evolving professional terminology and ensure accurate candidate-role matching in subsequent computations.

With continued reference to FIG. 1, in some embodiments, processor 104 may be configured to generate a plurality of graph nodes 148 by parsing tokenized role data 124 and identifying unique linguistic tokens or semantic entities representing professional skills or responsibilities. In some embodiments, processor 104 may apply part-of-speech tagging, dependency parsing, and named-entity recognition to detect candidate terms suitable for instantiation as graph nodes 148. In some embodiments, processor 104 may be configured to encode each graph node 148 with metadata describing its contextual position, such as associated skill category, importance weight, and textual location. In some embodiments, processor 104 may be configured to associate each graph node 148 with a corresponding critical value computed through the priority machine learning model. For the purposes of this disclosure, "critical value" is a numerical measure indicating the importance of the skill or attribute represented by the graph node relative to the requirements of role data. As a non-limiting example, processor 104 may assign a critical value of 0.90 to a graph node 148 representing "cross-border transaction structuring," indicating high relevance, and a critical value of 0.25 to a graph node 148 representing "administrative reporting," indicating lower relative importance.

With continued reference to FIG. 1, in some embodiments, processor 104 may be configured to determine one or more relationship edges 152 between pairs of graph nodes 148 based on the linguistic or statistical relationships identified within role data 124. In some embodiments, processor 104 may compute co-occurrence frequency metrics, correlation coefficients, or syntactic dependencies between skill expressions extracted from textual segments. In some embodiments, processor 104 may be configured to represent relationship edges 152 as weighted connections, where the weight corresponds to the strength or frequency of association between graph nodes 148. In some embodiments, relationship edge 152 may also include directionality, indicating a hierarchical dependency between a primary and secondary skill within a professional competency hierarchy. As a non-limiting example, processor 104 may define a directional relationship edge 152 from graph node 148 representing "legal drafting" to graph node 148 representing "document review," indicating that the latter activity is typically subordinate to or dependent on the former in role data 124.

With continued reference to FIG. 1, in some embodiments, processor 104 may be configured to store each graph node 148 and relationship edge 152 within a graph database or memory structure accessible for computation of alignment scores 132. In some embodiments, processor 104 may retrieve the set of graph nodes 148 and relationship edges 152 to construct an adjacency matrix representation, enabling efficient matrix-based similarity calculations against candidate embedding representations 128. For the purposes of this disclosure, "graph matrix" is a numerical data structure representing the connectivity and weighting of all relationship edges 152 among graph nodes 148 within structured graph 144. In some embodiments, processor 104 may be configured to normalize graph matrix prior to similarity computation to ensure that highly connected nodes do not disproportionately influence the resulting alignment score 132. As a non-limiting example, processor 104 may identify that the graph node 148 representing "communication skills" is connected to many other nodes across different roles and therefore scale its edge weights downward to balance its contribution during vector similarity calculation.

With continued reference to FIG. 1, in some embodiments, processor 104 may be configured to input structured graph 144, including all graph nodes 148 and relationship edges 152, into an embedding generation process to compute a role embedding. In some embodiments, processor 104 may apply a transformer-based natural language processing model 120 or a graph neural network algorithm to convert the relational structure of structured graph 144 into a dense vector representation suitable for comparison with embedding representation 128 generated from candidate data 116. For the purposes of this disclosure, "role embedding" is a multidimensional numerical representation derived from graph nodes 148 and relationship edges 152 that encodes the semantic structure and hierarchical relationships of role data 124. As a non-limiting example, in some embodiments, processor 104 may generate a role embedding where closely related nodes such as "mergers and acquisitions," "corporate restructuring," and "due diligence" form a tight cluster in vector space, reflecting their interconnectedness through relationship edges 152.

With continued reference to FIG. 1, in some embodiments, processor 104 may be configured to dynamically update graph nodes 148 and relationship edges 152 based on observed feedback from candidate evaluations or evolving role definitions. In some embodiments, processor 104 may periodically recompute edge weights, add or remove nodes, and update critical values to reflect the most current domain knowledge contained in newly ingested role data 124 from data sources 140.

With continued reference to FIG. 1, processor 104 is configured to generate an embedding representation 128 from the first dataset 112. For the purposes of this disclosure, an "embedding representation" is a multidimensional numerical vector representation encoding semantic meaning derived from the candidate data. As a non-limiting example, the embedding representation 128 may include a 768-dimensional vector space representation generated using a transformer-based architecture. In some embodiments, processor 104 may execute a transformer-based natural language processing model 120 to produce the embedding representation 128. For the purposes of this disclosure, a "transformer-based natural language processing model" is a neural network model including multi-head self-attention mechanisms, positional encoding layers, and feed-forward neural networks that capture contextual dependencies among tokens within a text sequence. The transformer-based natural language processing model 120 may be trained using training data that includes input elements and output elements specifically structured to capture semantic and contextual relationships between terms. The input elements may include tokenized text sequences representing candidate resumes, professional summaries, job descriptions, skill statements, and contextual modifiers extracted from structured and unstructured textual corpora. These input sequences may be encoded as numerical vectors capturing syntactic and semantic relationships among words and phrases. The output elements of the training data may include corresponding embedding vectors or prediction targets representing statistically learned associations between terms, such as similarity relationships between candidate qualifications and role requirements. In some embodiments, training data may originate from domain-specific corpora such as enterprise role databases, publicly available occupational taxonomies, industry-specific job postings, academic publications, and anonymized candidate profiles, as well as general-purpose language datasets to preserve linguistic diversity. Processor 104 may be configured to train the transformer-based natural language processing model 120 using a stochastic gradient descent algorithm or comparable optimization method to iteratively minimize an objective function defined as a sum of the relationships to be estimated between input terms and output terms, enabling the model to capture domain-relevant semantic representations and produce embedding vectors that accurately reflect contextual similarity between candidate data 116 and role data 124.

With continued reference to FIG. 1, the transformer-based natural language processing model 120 may be trained on domain-specific textual data. For the purposes of this disclosure, "domain-specific textual data" is training data including legal job descriptions, candidate resumes, and skill-to-competency mappings within the legal services sector. As a non-limiting example, domain-specific textual data may include thousands of anonymized legal job postings, historical hiring records, and annotated skill taxonomies. In some embodiments, processor 104 may be configured to train the transformer-based natural language processing model 120 using a stochastic gradient descent algorithm. For the purposes of this disclosure, a "stochastic gradient descent algorithm" is a learning algorithm configured to iteratively optimize an objective function representing statistical estimations of relationships between input and output terms, where the objective function is defined as a sum of the relationships to be estimated. In operation, the stochastic gradient descent algorithm updates model parameters by computing gradients of the loss function and adjusting weights to minimize prediction error.

With continued reference to FIG. 1, in some embodiments, processor 104 may be configured to generate the embedding representation 128 of candidate data 116 using the transformer-based natural language processing model 120 trained on the domain-specific textual data. The transformer-based natural language processing model 120, as previously defined, may be configured to encode the semantic and syntactic patterns of the candidate data 116 into a numerical vector representation that captures context-dependent relationships between words, phrases, and entities contained within the candidate data 116.

With continued reference to FIG. 1, in some embodiments, processor 104 may be configured to train the transformer-based natural language processing model 120 using a stochastic gradient descent algorithm. The stochastic gradient descent algorithm may iteratively adjust the internal model parameters, such as attention weights, layer coefficients, and embedding matrix values, based on gradients computed from prediction errors between model outputs and ground-truth relationships within the training dataset. In some embodiments, each iteration of the stochastic gradient descent algorithm may involve sampling a random subset of the training corpus to estimate the direction of the loss function's minimum, thereby improving computational efficiency and generalization performance.

With continued reference to FIG. 1, in some embodiments, processor 104 may be configured to optimize an objective function that represents statistical estimations of the relationships between input terms and output terms within the training data. For the purposes of this disclosure, the objective function is a mathematical construct used to measure the deviation between predicted contextual relationships and the true statistical associations observed in the domain-specific textual data. In some embodiments, the objective function may be defined as a sum of all estimated relational terms between the input and output sequences, wherein each term quantifies the strength of co-occurrence or dependency across the training corpus.

With continued reference to FIG. 1, as a non-limiting example, processor 104 may be configured to minimize a cross-entropy loss function across predicted token probabilities, thereby allowing the model to refine how it predicts successive words given prior context. In another example, processor 104 may employ a contrastive loss or next-sentence prediction loss when training on role-related textual data, enabling the model to capture semantic distinctions between role requirements and candidate qualifications. In some embodiments, optimization may proceed until the loss function converges below a threshold or until validation accuracy reaches a stable plateau.

With continued reference to FIG. 1, the trained transformer-based natural language processing model 120 may output embedding vectors that preserve latent contextual dependencies across words and phrases. These embedding vectors may represent high-dimensional encodings that situate similar candidate attributes, such as skill descriptions or experience details, in proximity within vector space. As a result, apparatus 100 may leverage these embeddings to perform alignment computations with the structured graph 144, ensuring that candidate-role similarity assessments are grounded in semantically meaningful representations learned through domain-specific optimization.

With continued reference to FIG. 1, processor 104 is configured to compute an alignment score 132 for each candidate represented in the first dataset 112. For the purposes of this disclosure, an "alignment score" is a numerical measure of similarity between an embedding representation and a structured graph. Processor 104 is configured to compute an alignment score 132 by determining vector similarity between the embedding representation 128 and the structured graph 144. For the purposes of this disclosure, "vector similarity" is a quantitative measure computed by processor to determine the degree of alignment or correspondence between two or more vector representations in a shared embedding space. Each vector representation may encode semantic, contextual, or relational features of data, such as candidate data 116 and structured graph 144, in high-dimensional numerical form. As a non-limiting example, vector similarity may be calculated using cosine similarity, wherein processor 104 may determine the cosine of the angle between two vector representations to quantify their directional alignment. A cosine similarity value of one may indicate perfect alignment, while a value of zero may indicate orthogonality, or no similarity. In some embodiments, processor 104 may compute vector similarity using alternative or additional metrics, such as Euclidean distance, Manhattan distance, or dot product-based correlation, depending on the representation space and data modality. In some embodiments, processor 104 may be configured to execute a similarity computation process that involves transforming both embedding representations into a shared vector space, normalizing them for magnitude, and performing a similarity operation, such as a cosine similarity or dot-product function, to generate the alignment score 132. As a non-limiting example, alignment score 132 may be calculated as a cosine similarity between vector embeddings of candidate skills and vector representations of required skills. In some embodiments, processor 104 may aggregate multiple similarity measures across dimensions including technical skills, professional experience, and contextual fit to generate a comprehensive alignment score 132.

With continued reference to FIG. 1, in some embodiments, processor 104 may be configured to normalize each embedding vector to a unit vector prior to similarity computation to ensure that alignment score 132 reflects relative directional similarity rather than vector magnitude. In some embodiments, processor 104 may compute cosine similarity as the ratio of the dot product of the candidate embedding representation 128 and the role embedding to the product of their respective magnitudes, producing a value between −1 and 1, where higher values indicate stronger correspondence. In some embodiments, processor 104 may apply a scaling transformation to alignment score 132 to convert raw similarity values into a normalized score range suitable for ranking and interpretability.

With continued reference to FIG. 1, processor 104 is configured to apply one or more weighting functions 156 to the alignment scores 132 and scale the alignment scores 132 in proportion to the one or more weighting functions 156. For the purposes of this disclosure, a "weighting function" is a mathematical transformation configured to scale an alignment score in proportion to a critical value associated with one or more graph nodes of the structured graph. As a non-limiting example, processor 104 may apply a sigmoid or exponential scaling function to amplify contributions of critical skills relative to non-critical skills. In some embodiments, processor 104 may determine a model-learned priority using a priority machine-learning model. For the purposes of this disclosure, a "priority machine-learning model" is a trained model configured to identify a priority pattern within the second dataset 136. As a non-limiting example, the priority machine-learning model may be implemented as a gradient boosting regression tree trained on historical placement data, where the input features correspond to role skill frequencies and recruiter annotations, and the output labels represent observed skill importance rankings. Processor 104 may assign a critical value to each graph node of the structured graph 144 as a function of the model-learned priority. The input elements of the training data may include tokenized and vectorized representations of role data 124, such as skill expressions, contextual modifiers, and hierarchical dependencies among skill categories, each represented as numerical feature vectors encoding semantic and structural attributes. The output elements may include corresponding priority labels or numerical weights representing the relative importance of each skill or contextual feature within a role. In some embodiments, the training data may be derived from a combination of publicly available datasets such as occupational taxonomies, professional databases, and role classification corpora, as well as proprietary sources such as enterprise-specific job descriptions, employee performance data, and historical candidate-role matching outcomes. Processor 104 may be configured to train the priority machine-learning model using a stochastic gradient descent algorithm or equivalent optimization process that iteratively minimizes a loss function measuring deviation between predicted and actual priority weights, thereby enabling the model to learn patterns of feature significance within the role data 124 and subsequently assign a model-learned priority to each graph node 148 for use in computing or refining critical values associated with alignment score 132 generation.

With continued reference to FIG. 1, in some embodiments, processor 104 may be configured to apply one or more weighting functions 156 to the alignment scores 132 by determining a model-learned priority as a function of the role data 124 using a priority machine-learning model. For the purposes of this disclosure, a "model-learned priority" is a quantified representation of importance or relevance that is learned by a machine-learning model as a function of role data 124. The model-learned priority represents a numeric or probabilistic value that indicates how critical a particular graph node 148, such as a skill, qualification, or contextual modifier, is in determining alignment between the candidate data 116 and the role data 124. The priority machine-learning model may be configured to learn which skill expressions or graph nodes 148 contribute most significantly to determining alignment between candidate data 116 and role data 124, thereby enabling processor 104 to compute weighted similarity measures that reflect real-world importance rather than purely statistical proximity.

With continued reference to FIG. 1, in some embodiments, processor 104 may be configured to train the priority machine-learning model using priority training data, where the priority training data includes labeled examples of role descriptions, historical candidate evaluations, or hiring outcomes associated with successful and unsuccessful candidate-role matches. For the purposes of this disclosure, "priority training data" is defined as a dataset containing representative instances of skill-to-role relationships annotated with corresponding priority scores or relevance indicators. As a non-limiting example, the priority training data may include pairs of skills and roles labeled with criticality levels, such as "essential," "preferred," or "optional," which serve as supervisory signals for training the model to learn feature importance across the graph structure.

With continued reference to FIG. 1, in some embodiments, the priority machine-learning model may include one or more supervised or semi-supervised architectures such as gradient-boosted decision trees, feedforward neural networks, or attention-based ranking models. Each architecture may be configured to learn a mapping function that correlates feature representations of graph nodes 148, derived from tokenized skill categories and contextual modifiers, to corresponding importance weights. In some embodiments, processor 104 may be configured to extract intermediate representations from the transformer-based natural language processing model 120 and provide these as input embeddings to the priority machine-learning model, thereby integrating linguistic and relational understanding into the weighting computation.

With continued reference to FIG. 1, in some embodiments, processor 104 may be configured to determine a model-learned priority for each graph node 148, wherein the model-learned priority quantifies the degree of influence or significance of that graph node 148 relative to the overall role context. The model-learned priority may be expressed as a scalar value or normalized score between zero and one, indicating the relative contribution of each node to candidate-role alignment. As a non-limiting example, for a role data 124 corresponding to a "data scientist," graph nodes 148 related to "machine learning" or "statistical modeling" may receive higher model-learned priority values than those associated with "report writing" or "data entry."

With continued reference to FIG. 1, once the model-learned priority is determined, processor 104 may be configured to assign a critical value to each graph node 148 as a function of the model-learned priority. In some embodiments, processor 104 may be configured to scale or normalize the critical value relative to the distribution of model-learned priorities, ensuring that disproportionately influential nodes do not dominate the alignment process.

With continued reference to FIG. 1, in some embodiments, processor 104 may be configured to use the critical values to apply one or more weighting functions 156 during similarity computation between the embedding representation 128 of candidate data 116 and the structured graph 144 of role data 124. As a result, alignment scores 132 may more accurately reflect the practical or domain-specific importance of certain skills and contextual relationships, leading to a more interpretable and technically robust ranking of candidates. This approach allows apparatus 100 to dynamically adapt weighting behavior based on learned patterns from real-world data, improving decision accuracy and transparency in the vector-based data mapping process.

With continued reference to FIG. 1, in some embodiments, processor 104 may be configured to apply one or more weighting functions 156 to alignment score 132 to emphasize the relative contribution of critical skills represented by graph nodes 148 in structured graph 144. In some embodiments, processor 104 may compute a skill-level sub-score for each graph node 148 by measuring the similarity between the candidate embedding representation 128 segment associated with that skill and the graph node's embedding vector within structured graph 144. Processor 104 may then multiply each sub-score by its corresponding critical value and sum the results to generate a weighted alignment score 132.

With continued reference to FIG. 1, in some embodiments, processor 104 may be configured to execute matrix-based scaling operations to efficiently perform these weighting and similarity calculations. In some embodiments, processor 104 may represent candidate embedding representations 128 and role embeddings as matrices, each row corresponding to an embedding vector of a particular feature, such as a skill or attribute. Processor 104 may then execute a matrix multiplication operation between the candidate embedding matrix and the transposed role embedding matrix to produce a similarity matrix containing pairwise similarity values between candidate features and role features. Processor 104 may apply element-wise weighting using critical values, producing a weighted similarity matrix that processor 104 subsequently aggregates using a summation or pooling operation to generate alignment score 132 for each candidate.

With continued reference to FIG. 1, in some embodiments, processor 104 may be configured to incorporate contextual scaling, which adjusts the weighting applied to certain graph nodes 148 based on relational structure expressed by relationship edges 152 within structured graph 144. For the purposes of this disclosure, "contextual scaling" is an adjustment factor computed as a function of the connectivity strength of each graph node, its relationship edge weights, and its critical value, enabling processor 104 to emphasize skills that are both critical and contextually central within structured graph. In some embodiments, processor 104 may compute contextual scaling through an iterative propagation process similar to that of a graph convolutional operation, in which importance values are diffused along relationship edges 152 and combined to update the effective weight of each node prior to alignment score 132 computation.

With continued reference to FIG. 1, in some embodiments, processor 104 may be configured to integrate multiple dimensions of similarity beyond skill alignment, such as experience level, cultural fit, or domain specialization, into the overall alignment score 132. In some embodiments, processor 104 may compute separate similarity measures for each dimension and combine them through a linear or non-linear fusion function. As a non-limiting example, processor 104 may compute an experience similarity score by comparing numerical experience embeddings derived from candidate data 116 with experience-level descriptors extracted from role data 124 and then merge that result with skill-based similarity to produce a composite alignment score 132.

With continued reference to FIG. 1, in some embodiments, processor 104 may be configured to execute the weighting function 156 as a linear scaling operation, where each sub-score associated with a skill-level similarity is multiplied by its critical value and subsequently summed across all graph nodes 148 to produce a total weighted alignment score 132. In some embodiments, processor 104 may also be configured to apply a non-linear scaling transformation, such as a sigmoid or exponential weighting function, to accentuate distinctions between high-priority and low-priority competencies. In some embodiments, processor 104 may implement these operations in matrix form, representing candidate embedding representations 128 and role embeddings as multi-dimensional matrices and applying element-wise multiplication using the matrix of critical values as the weighting matrix. As a non-limiting example, processor 104 may compute a weighted similarity matrix in which elements corresponding to essential skills such as "cross-border negotiation" are amplified, while elements corresponding to secondary attributes such as "administrative reporting" are attenuated, resulting in a proportionally scaled alignment score 132 that better represents the role's competency hierarchy.

With continued reference to FIG. 1, in some embodiments, processor 104 may be configured to normalize or rescale the weighted alignment scores 132 to maintain interpretability across multiple roles and candidates. In some embodiments, processor 104 may apply normalization function to transform the distribution of alignment scores 132 into a defined output range, such as 0 to 1 or 0 to 100. In some embodiments, processor 104 may be configured to perform adaptive scaling by applying contextual scaling, wherein the relative influence of each weighting function 156 is adjusted based on relational connectivity among graph nodes 148 and the strength of relationship edges 152 within structured graph 144. This ensures that graph nodes 148 central to multiple skill relationships exert proportionate influence without causing over-weighting of generic or pervasive skills.

With continued reference to FIG. 1, in some embodiments, processor 104 may be configured to output the scaled alignment scores 132 along with intermediate values representing the applied weighting functions 156 and corresponding critical values. In some embodiments, these intermediate results may be stored in memory and subsequently used by processor 104 to generate breakdown texts 160 through the language model, providing an interpretable explanation of how weighting functions 156 influenced each candidate's score. For the purposes of this disclosure, the scaling of alignment scores 132 in proportion to weighting functions 156 enables processor 104 to produce a quantitatively refined representation of candidate-to-role alignment that accounts for both the intrinsic similarity between embedding vectors and the relative importance of domain-specific skills represented by graph nodes 148.

With continued reference to FIG. 1, processor 104 is configured to generate a data output 164. For the purposes of this disclosure, a "data output" is structured output information. Data output 164 includes a ranked list 168 of the plurality of candidates and a set of breakdown texts 160 corresponding to each candidate. As a non-limiting example, processor 104 may generate a data output 164 where each candidate entry includes a rank position, total alignment score, and corresponding breakdown text explaining how individual skills contributed to the candidate's match.

With continued reference to FIG. 1, for the purposes of this disclosure, "ranked list" is a structured data construct that organizes candidates in a descending or ascending order according to numerical alignment score 132 values generated by processor 104, thereby expressing the relative suitability of each candidate for a given role defined by role data 124. For the purposes of this disclosure, ranked list 168 is an interpretable output artifact that serves as both a quantitative and qualitative index of model evaluation results produced within apparatus 100.

With continued reference to FIG. 1, in some embodiments, processor 104 may be configured to generate ranked list 168 by executing a sorting operation over an array of alignment scores 132 computed for all candidates under evaluation. In some embodiments, processor 104 may be configured to apply a sorting algorithm, such as quicksort, merge sort, or heap sort, optimized for numerical precision and stability to maintain consistent ordering when multiple candidates share similar alignment scores 132. In some embodiments, processor 104 may further assign positional metadata to each candidate within ranked list 168, including rank index, percentile position, and scaled score value. As a non-limiting example, a candidate with an alignment score 132 of 0.92 may be assigned a rank index of 1, indicating the highest degree of match, while a candidate with an alignment score 132 of 0.65 may be assigned a rank index of 10, indicating a comparatively lower alignment with the same role data 124.

With continued reference to FIG. 1, in some embodiments, processor 104 may be configured to enrich ranked list 168 by associating each ranked entry with additional analytical elements, including the corresponding breakdown text 160, critical values applied during score weighting, and sub-scores for skill-level alignment dimensions. In some embodiments, processor 104 may be configured to store this information as a composite record for each candidate, thereby allowing the graphical user interface 172 to present ranked list 168 with full interpretive detail. In some embodiments, processor 104 may be configured to structure ranked list 168 in a tabular or hierarchical format, enabling cross-role comparison when multiple instances of role data 124 are being evaluated concurrently.

With continued reference to FIG. 1, in some embodiments, processor 104 may be configured to dynamically generate ranked list 168 in response to user-defined filtering criteria. In some embodiments, processor 104 may be configured to recalculate or reorder ranked list 168 when a user specifies a constraint such as minimum experience level, skill category inclusion, or target jurisdiction. In some embodiments, processor 104 may apply additional normalization function to ensure that scaled alignment scores 132 remain comparable across filtered subsets. As a non-limiting example, processor 104 may generate a ranked list 168 displaying only those candidates whose skill profiles align with "corporate law," with adjusted alignment scores 132 normalized relative to that subset's score distribution.

With continued reference to FIG. 1, in some embodiments, processor 104 may be configured to generate ranked list 168 for display through graphical user interface 172. In some embodiments, processor 104 may transmit ranked list 168 as a structured dataset to the user interface rendering engine, enabling visualization through sortable columns, color-coded indicators, or relevance bars proportional to alignment score 132. In some embodiments, processor 104 may be configured to associate ranked list 168 with interactive breakdown text 160 outputs that provide users with explanatory narratives describing the underlying reasons for each candidate's ranking.

With continued reference to FIG. 1, in some embodiments, processor 104 may be configured to store ranked list 168 within memory or persist it to a data source 140 for record keeping, auditability, or feedback training. In some embodiments, stored ranked list 168 may be retrieved by processor 104 to construct labeled datasets for retraining the priority machine learning model or to evaluate the performance of transformer-based natural language processing model 120 in future iterations. For the purposes of this disclosure, ranked list 168 serves as a primary output data structure that communicates the ordered results of vector-based data mapping computations executed by processor 104, linking quantitative alignment results to interpretable qualitative narratives for human decision-making within apparatus 100.

With continued reference to FIG. 1, for the purposes of this disclosure, "breakdown text" is a machine-generated textual narrative that explicitly identifies and interprets correlations between candidate data 116 and role data 124, the corresponding graph nodes 148 and relationship edges 152, and the applied weighting functions 156 and critical values that influenced the computed alignment score 132. For the purposes of this disclosure, breakdown text 160 is an interpretable output artifact of apparatus 100 that enables end users to understand which attributes or skills primarily contributed to the candidate-role correspondence determined by processor 104.

With continued reference to FIG. 1, processor 104 may generate the breakdown texts 160 using a language model. For the purposes of this disclosure, a "language model" is an artificial intelligence model trained to generate natural-language text based on structured or numerical input features. As a non-limiting example, the language model may be a fine-tuned transformer decoder trained on recruiter evaluation narratives and prior match explanations. The training data for the language model may include pairs of structured candidate-role alignment data and corresponding human-written explanations. The output of the language model may include syntactically coherent and semantically faithful natural-language summaries describing candidate-role alignment.

With continued reference to FIG. 1, in some embodiments, processor 104 may be configured to generate breakdown text 160 using a language model trained to convert structured numerical and categorical analysis data into natural language summaries. In some embodiments, language model may be a transformer-based text generation model trained using supervised fine-tuning on training data that includes examples of human-written recruitment evaluations or analytical summaries linking feature importance metrics to textual explanations. As a non-limiting example, the training data for language model may include paired records in which a set of alignment scores 132, skill weights, and feature vectors are associated with a human-authored paragraph explaining why a given candidate is a strong or weak fit for a particular role data 124 instance. The model may be trained using stochastic gradient descent to minimize a cross-entropy loss function between predicted token sequences and ground-truth explanation sequences, enabling the model to learn the mapping from analytical features to human-readable narrative text.

With continued reference to FIG. 1, in some embodiments, processor 104 may be configured to input a structured feature vector representing the alignment results of a given candidate into the language model. The input feature vector may include, without limitation, the alignment score 132, the top N critical values influencing that score, contextual scaling factors, and identifiers of the most influential graph nodes 148. In some embodiments, processor 104 may be configured to generate a corresponding output sequence from the language model, where the output tokens form a coherent natural language summary describing the relationship between candidate data 116 and role data 124. As a non-limiting example, breakdown text 160 may include a statement such as "The candidate demonstrates strong alignment with the role's requirements in corporate negotiation and regulatory compliance, with moderate alignment in cross-border transaction experience."

With continued reference to FIG. 1, in some embodiments, processor 104 may be configured to post-process the raw output of the language model to ensure grammatical correctness, consistency of terminology with role data 124, and factual alignment with computed analytical results. In some embodiments, processor 104 may apply a text validation procedure that matches each referenced skill in breakdown text 160 against its corresponding graph node 148 within structured graph 144. This ensures that no generated explanation refers to skills or competencies not actually represented in the model's input data. In some embodiments, processor 104 may also apply a ranking-based pruning operation to select the most relevant sentences within breakdown text 160 based on contribution scores or token-level attention weights computed during generation.

With continued reference to FIG. 1, in some embodiments, processor 104 may be configured to associate each breakdown text 160 with a specific entry within ranked list 168, thereby producing a paired dataset linking numerical rankings and textual explanations. In some embodiments, processor 104 may be configured to store this mapping within memory such that graphical user interface 172 can render each candidate's breakdown text 160 in proximity to its corresponding alignment score 132 or rank index. In some embodiments, processor 104 may be configured to output breakdown text 160 in multiple tiers of granularity, including short summaries suitable for preview panels and extended narrative reports that include detailed justifications, feature-level impact descriptions, and suggested areas of improvement for each candidate.

With continued reference to FIG. 1, in some embodiments, processor 104 may be configured to continuously improve the generation of breakdown text 160 by collecting user feedback signals from graphical user interface 172. Feedback data may include user selections, edits, or approval indicators that identify whether a particular breakdown text 160 is perceived as accurate or useful. Processor 104 may use such feedback data to update the training dataset for language model, enabling iterative refinement of its explanatory performance over time. For the purposes of this disclosure, breakdown text 160 is the natural language interpretive component of apparatus 100, providing transparency and human interpretability to the vector-based data mapping process performed by processor 104, ensuring that complex machine learning computations produce outputs comprehensible to non-technical end users.

With continued reference to FIG. 1, in some embodiments, language model may include a large language model (LLM) configured to generate breakdown text 160 from alignment scores 132, graph nodes 148, and critical values produced by processor 104. For the purposes of this disclosure, "large language model" is a deep learning architecture configured to recognize, summarize, interpret, and generate text based on correlations learned from large-scale textual datasets. In some embodiments, large language model is a natural language processing model trained to transform structured data representations-such as alignment vectors and weighted node matrices-into coherent, human-readable explanations describing candidate-to-role correspondence within apparatus 100. In some embodiments, large language model may include transformer-based architectures capable of capturing long-range dependencies within textual data through self-attention mechanisms, thereby enabling contextual reasoning when generating breakdown text 160.

With continued reference to FIG. 1, in some embodiments, large language model may include or be derived from architectures such as GPT (Generative Pretrained Transformer), GPT-2, GPT-3, GPT-4, BERT (Bidirectional Encoder Representations from Transformers), or T5 (Text-to-Text Transfer Transformer). Each of these architectures may be implemented according to the processing requirements of apparatus 100. In some embodiments, processor 104 may be configured to implement large language model as a generative text prediction model that applies a probability distribution to sequential text tokens to predict subsequent tokens within generated breakdown text 160. As a non-limiting example, if alignment data includes a role emphasizing "contract negotiation" and "cross-border compliance," large language model may predict that the next descriptive phrase within breakdown text 160 should reference "transactional advisory expertise." In some embodiments, large language model may include an encoder-decoder framework wherein the encoder component processes structured analytical input, such as numerical alignment vectors, and the decoder component generates corresponding natural language outputs.

With continued reference to FIG. 1, in some embodiments, large language model may include an attention mechanism. For the purposes of this disclosure, "attention mechanism" is a neural operation that enables large language model to dynamically assign higher computational weight to input features that are most relevant for a given output generation step. In some embodiments, attention mechanism may operate on a sequence of token embeddings representing skill terms or semantic concepts within structured graph 144. Attention mechanism may enable large language model to emphasize the most influential graph nodes 148—those with higher critical values—when composing breakdown text 160. In some embodiments, attention mechanism may overcome the limitations of fixed-length encoder-decoder models by enabling variable-length dependency mapping, allowing processor 104 to handle longer, complex text sequences such as detailed role descriptions and multi-skill comparisons across candidates.

With continued reference to FIG. 1, in some embodiments, large language model may be based on a transformer architecture. For the purposes of this disclosure, "transformer architecture" is a neural network framework that processes sequential input data using self-attention and positional encoding instead of recurrent iteration. In some embodiments, processor 104 may be configured to input alignment scores 132, role embeddings, and contextual weighting factors into transformer architecture in order to produce semantically structured breakdown text 160. For the purposes of this disclosure, "positional encoding" is a representation technique used by transformer architecture to preserve the order of tokens or vectorized features within an input sequence. As a non-limiting example, positional encoding may use sine and cosine functions to assign distinct position vectors to each input element, thereby allowing large language model to understand hierarchical relationships between role skills and candidate attributes.

With continued reference to FIG. 1, in some embodiments, large language model may use multi-headed attention to analyze multiple contextual relationships simultaneously. For the purposes of this disclosure, "multi-headed attention" is a configuration in which several independent attention operations-called heads-process distinct portions of input data in parallel, each learning different contextual associations. In some embodiments, processor 104 may be configured to provide to large language model multiple data channels, including skill similarity matrices, critical value vectors, and role-context embeddings. Each head of multi-headed attention may focus on a different analytical dimension, such as skill relevance, experience alignment, or cultural fit. The resulting context vectors may then be concatenated and passed through a feed-forward network to generate a unified representation used to compose breakdown text 160.

With continued reference to FIG. 1, in some embodiments, large language model may implement self-attention, which allows the model to compare each token or vectorized feature within the input sequence to all others in order to determine relational dependencies. For the purposes of this disclosure, "self-attention" is an operation that computes contextual similarity between elements of an input sequence to dynamically determine which elements are most relevant to the current generation step. In some embodiments, processor 104 may configure large language model to represent input features as query vectors, key vectors, and value vectors, each corresponding respectively to analytical queries, relational relevance, and semantic content. Processor 104 may compute attention weights by calculating dot-product similarity between query and key vectors, scaling the results, and applying a softmax function to generate normalized attention weights. In some embodiments, the weighted sum of value vectors may produce the output context vector, which informs the next token generation step in breakdown text 160.

With continued reference to FIG. 1, in some embodiments, processor 104 may be configured to apply a look-ahead masking mechanism when large language model operates in an autoregressive decoding mode. For the purposes of this disclosure, "look-ahead masking" is a technique that prevents the model from conditioning on future tokens not yet generated during sequence generation. In some embodiments, this ensures that breakdown text 160 is produced sequentially, maintaining narrative consistency when explaining candidate-role alignment reasoning.

With continued reference to FIG. 1, in some embodiments, transformer architecture within large language model may include residual connections, normalization layers, and feed-forward networks configured to stabilize gradient propagation and enhance representational capacity. In some embodiments, processor 104 may be configured to add residual connections between input and output of multi-headed attention sublayers, followed by layer normalization and non-linear transformation using ReLU activation functions. In some embodiments, this configuration enables large language model to preserve low-level numerical context (such as alignment magnitude) while refining high-level semantic structure during breakdown text 160 generation.

With continued reference to FIG. 1, in some embodiments, large language model may employ an encoder-decoder architecture. Encoder component may receive and embed structured analytical data, such as normalized alignment scores 132 and critical value matrices, while decoder component may generate natural language explanations forming breakdown text 160. In some embodiments, decoder component may include multiple layers of multi-headed attention, each layer conditioning on encoder outputs to ensure textual accuracy and factual grounding in role data 124.

With continued reference to FIG. 1, in some embodiments, large language model may output a probability distribution over a vocabulary of linguistic tokens at each generation step. Processor 104 may select the most probable token, corresponding to the next word in breakdown text 160, using a softmax-based sampling method. In some embodiments, processor 104 may continue the decoding process until an end token is produced, completing the breakdown text 160 sequence.

With continued reference to FIG. 1, in some embodiments, processor 104 may incorporate retrieval-augmented generation (RAG) into large language model. For the purposes of this disclosure, "retrieval-augmented generation" is a process that enhances the contextual accuracy of generated text by retrieving external information relevant to the model's input before text generation. In some embodiments, processor 104 may retrieve supplementary role data 124 or industry-specific terminology from external or internal data sources and input the retrieved text into large language model alongside analytical embeddings, ensuring that breakdown text 160 reflects domain-specific accuracy rather than generic phrasing.

With continued reference to FIG. 1, in some embodiments, processor 104 may be configured to perform similarity-based retrieval when implementing retrieval-augmented generation. For the purposes of this disclosure, "similarity-based retrieval" is a process by which a query embedding representing analytical context is compared to a corpus of document embeddings to identify the most semantically relevant reference materials. In some embodiments, processor 104 may encode the current role data 124 and candidate data 116 into embedding vectors, compare them with stored embeddings from curated legal or recruitment datasets, and retrieve the most contextually similar documents to provide factual grounding for large language model before generating breakdown text 160.

With continued reference to FIG. 1, in some embodiments, processor 104 may generate hypothetical document embeddings representing its internal semantic understanding of a candidate-role relationship. For the purposes of this disclosure, "hypothetical document embedding" is an embedding vector synthesized by a large language model to simulate a representative document summarizing the candidate's alignment profile. In some embodiments, processor 104 may compare hypothetical document embeddings with existing domain embeddings to refine contextual accuracy before generating the final breakdown text 160.

With continued reference to FIG. 1, in some embodiments, processor 104 may be configured to train large language model using LLM training data. For the purposes of this disclosure, "LLM training data" is a dataset comprising pairs of structured analytical representations (such as alignment score matrices, graph node critical values, and role embeddings) and corresponding human-authored textual explanations. In some embodiments, processor 104 may train large language model using supervised fine-tuning to minimize cross-entropy loss between predicted and ground-truth explanations. In some embodiments, processor 104 may update LLM training data iteratively using feedback data collected from graphical user interface 172, including user approval or correction of generated breakdown text 160.

With continued reference to FIG. 1, in some embodiments, large language model may be initially generally trained and subsequently specifically trained. For the purposes of this disclosure, "generally trained" refers to training performed on large-scale open-domain corpora to learn universal linguistic and syntactic structures. For the purposes of this disclosure, "specifically trained" refers to fine-tuning performed on domain-specific data relevant to legal practice, recruitment, or skill mapping. In some embodiments, processor 104 may initially pretrain large language model using general text corpora such as articles, academic texts, and professional biographies, and then fine-tune it on curated legal role descriptions and candidate evaluation datasets.

With continued reference to FIG. 1, in some embodiments, processor 104 may be configured to perform fine-tuning using Low-Rank Adaptation (LoRA). For the purposes of this disclosure, "Low-Rank Adaptation" is a computationally efficient training technique that modifies only a subset of parameters within large language model, thereby reducing memory requirements and training time. In some embodiments, processor 104 may fine-tune large language model using LoRA to adapt it specifically to the language and interpretive style of professional role-to-candidate matching without retraining the entire parameter space.

With continued reference to FIG. 1, in some embodiments, processor 104 may retrain large language model periodically using updated LLM training data that incorporates new role data 124 or updated candidate data 116 embeddings collected over time. In some embodiments, this continual adaptation enables apparatus 100 to maintain linguistic and analytical relevance as domain-specific terminology and skill structures evolve. For the purposes of this disclosure, large language model functions as the interpretive and generative text synthesis component of apparatus 100, configured to translate analytical computations performed by processor 104 into coherent breakdown text 160 outputs that provide human-interpretable explanations of alignment results and rankings.

With continued reference to FIG. 1, processor 104 is configured to generate a graphical user interface 172 that renders data output 164 including ranked list 168 and breakdown text 160 produced by apparatus 100. For the purposes of this disclosure, "graphical user interface" is a display interface that presents analytical artifacts generated by processor 104 in a human-interpretable layout, including visual encodings of alignment score 132 and indicators derived from critical value associated with graph node 148 in structured graph 144. In some embodiments, graphical user interface 172 may include relevance bars proportional to alignment score 132, badges indicating contributions from the highest critical value nodes, tooltips enumerating top skill-level sub-scores, and expandable panels that reveal per-skill influences referenced in breakdown text 160; in some embodiments, graphical user interface 172 may be configured to enable sorting, filtering, and grouping operations across ranked list 168 based on role data 124 attributes, candidate data 116 attributes, minimum alignment thresholds, or specific graph node 148 inclusions.

With continued reference to FIG. 1, in some embodiments, graphical user interface 172 may be configured to operate on a user device communicatively connected to processor 104 and to present interaction controls tailored to vector-based data mapping; in some embodiments, controls may include toggles to surface only candidates meeting specified graph node 148 requirements, sliders to adjust relative emphasis on experience versus skill similarity, and selectors to apply saved views of role data 124 variants. For the purposes of this disclosure, "user input field" is an interface element configured to receive user-provided parameters that condition ranking and explanation rendering; in some embodiments, user input field may include search boxes for skill terms, range selectors for years of experience, and filters for jurisdiction or practice area, each of which causes processor 104 to update ranked list 168 and regenerate associated breakdown text 160.

With continued reference to FIG. 1, in some embodiments, graphical user interface 172 may include interactive reordering and comparison functions that allow users to select multiple candidates and view side-by-side breakdown text 160 aligned to shared graph node 148 sets; in some embodiments, processor 104 may be configured to compute delta explanations that highlight which critical value differences drove the relative movement in ranking, and graphical user interface 172 may render those differences as annotated bars or badges attached to the relevant skills within the comparison view.

With continued reference to FIG. 1, in some embodiments, processor 104 may be configured to generate a display data structure that encapsulates the elements needed by graphical user interface 172 to render final output consistently across views. For the purposes of this disclosure, "display data structure" is a structured representation including candidate identifiers, alignment score 132 values, the top contributing graph node 148 references with their critical value coefficients, and token spans of breakdown text 160; in some embodiments, display data structure may be transmitted from processor 104 to the rendering layer so that graphical user interface 172 can draw ranked list 168, on-demand explanations, and per-skill visualizations without requerying upstream models.

With continued reference to FIG. 1, in some embodiments, graphical user interface 172 may be configured to surface real-time alerts tied to analytical states computed by processor 104. For the purposes of this disclosure, "real-time alert" is a notification object generated when a monitored condition related to vector-based mapping is met; in some embodiments, monitored conditions may include alignment score 132 dropping below a user-defined minimum, absence of required graph node 148 matches in a candidate subset, staleness of role embedding beyond a refresh interval, or excessive variance in weighting function 156 effects indicating potential overemphasis on a single critical value. In some embodiments, real-time alerts may be displayed inline within ranked list 168 or as a dedicated panel that enumerates the triggering condition and offers a control to re-run scoring with adjusted parameters.

With continued reference to FIG. 1, in some embodiments, graphical user interface 172 may include event handler logic that responds to user interactions and directs processor 104 to refresh analytical outputs accordingly. For the purposes of this disclosure, "event handler" is a callback routine that activates upon a user action to request recomputation or reformatting of data output 164; in some embodiments, event handler may respond to selecting a different weighting emphasis, dragging a candidate into a comparison tray, expanding a breakdown text 160 section for full narrative, or applying a saved role data 124 profile, and processor 104 may be configured to recalculate alignment score 132, regenerate breakdown text 160, and update display data structure so that graphical user interface 172 reflects the most current analytical state.

With continued reference to FIG. 1, in some embodiments, graphical user interface 172 may present auditability controls enabling export of final output with embedded provenance, where processor 104 may be configured to attach references to the specific role embedding version, structured graph 144 snapshot, weighting function 156 configuration, and timestamps of candidate embedding representation 128 generation; in some embodiments, this export function may facilitate compliance and review by allowing downstream systems to reproduce ranking outcomes and verify that each breakdown text 160 corresponds to the exact analytical inputs rendered at the time of decision.

With continued reference to FIG. 1, in some embodiments, processor 104 may be configured to generate a graphical user interface 172 that includes a plurality of visual indicators representing the alignment scores 132 as interactive graphical elements. For the purposes of this disclosure, a "visual indicator" is a graphical representation of quantitative or categorical information. The visual indicators may include, without limitation, progress bars, color-coded similarity meters, ranked candidate panels, or node-link visualizations that display the strength of correspondence between the candidate data 116 and the role data 124. In some embodiments, the interactive graphical elements may be configured to receive user interaction, such as mouse clicks, drags, or touch-based gestures, allowing users to explore, sort, or filter candidate results. As a non-limiting example, an interactive graphical element may display an alignment bar for each candidate, where the bar length and color intensity correspond to the normalized alignment score 132. for the purposes of this disclosure, an "interactive graphical element" is a visual component rendered within graphical user interface that is configured to both display data output and receive user input in response to that display. Interactive graphical elements are not static representations but instead include dynamically updateable components that enable a user to manipulate or respond to displayed data in real time through input actions such as clicking, selecting, dragging, or hovering. As a non-limiting example, interactive graphical elements may include selectable bars, sliders, icons, dropdown menus, or ranking tiles corresponding to candidate identifiers or alignment score values. In some embodiments, interactive graphical elements may visually encode quantitative or categorical attributes of alignment score 132, such as intensity, magnitude, or category relevance. In some embodiments, processor 104 may be configured to detect and process input signals generated in response to user interaction with interactive graphical elements, such as feedback data reflecting user adjustments to ranking order or score weighting. In some embodiments, feedback data may be stored and subsequently utilized to update one or more weighting functions 156 or modify the presentation of ranked list 168, thereby enabling adaptive system behavior based on user engagement.

With continued reference to FIG. 1, in some embodiments, processor 104 may be configured to receive feedback data in response to user interactions with the plurality of visual indicators. For the purposes of this disclosure, "feedback data" is data generated from explicit or implicit user actions that indicate user preference, agreement, or disagreement with system-generated candidate rankings or explanations. As a non-limiting example, feedback data may include user adjustments to candidate ordering, confirmations of preferred candidates, or annotations that describe perceived strengths or weaknesses in candidate-role alignment. In some embodiments, feedback data may also include interaction metrics, such as frequency of clicks or hover duration over specific graphical elements, which may serve as implicit signals of user intent or confidence.

With continued reference to FIG. 1, in some embodiments, processor 104 may be configured to update the one or more weighting functions 156 as a function of the feedback data. Updating the weighting functions 156 may include dynamically recalibrating the critical values associated with the plurality of graph nodes 148 based on aggregated or real-time user feedback. Processor 104 may be configured to increase the critical value for graph nodes 148 that correspond to skill attributes frequently selected or emphasized by users and decrease the critical value for those that receive minimal attention or negative feedback.

With continued reference to FIG. 1, in some embodiments, processor 104 may apply adaptive learning techniques to perform these updates. As a non-limiting example, processor 104 may implement a reinforcement learning mechanism or an online gradient update process to iteratively adjust weighting functions 156 based on cumulative feedback data. The updated weighting functions 156 may then be stored in memory and utilized in subsequent alignment computations, enabling apparatus 100 to progressively refine its ranking and interpretability outputs in accordance with user interaction patterns.

With continued reference to FIG. 1, this feedback-driven adjustment process may enable apparatus 100 to achieve a closed-loop learning cycle in which user interaction data continuously informs and improves candidate-role alignment performance. As a result, the graphical user interface 172 not only functions as a visualization tool but also as a feedback acquisition mechanism, allowing human evaluators to influence the interpretability and precision of the underlying vector-based data mapping algorithm through direct, intuitive engagement.

The disclosed embodiments may provide a technical improvement in computer-based data mapping and similarity analysis by addressing inefficiencies and inaccuracies present in conventional systems that rely on static keyword matching or rule-based correlation techniques. In some embodiments, the disclosed apparatus 100 may improve computational efficiency and accuracy in aligning unstructured data sources, such as candidate resumes and role descriptions, through specialized data structures and adaptive machine learning mechanisms. In some embodiments, processor 104 may be configured to utilize a transformer-based natural language processing model trained on domain-specific textual data, which may enable generation of high-dimensional embedding representations that capture contextual and hierarchical relationships between linguistic elements. This configuration may provide a technical advantage over traditional vectorization methods by improving the accuracy and semantic depth of similarity computations. The attention mechanisms implemented within the transformer architecture may allow the system to selectively focus on relevant tokens, thereby reducing redundant computation and improving inference speed. In some embodiments, the apparatus 100 may further include a structured graph 144 representation of role data 124 that incorporates graph nodes 148 and relationship edges 152 derived as a function of co-occurrence frequency and hierarchical dependency between skill categories. This graph-based structure may enhance the system's ability to process heterogeneous data efficiently by reducing dimensional complexity while maintaining contextual precision. As a result, processor 104 may execute vector similarity operations with improved scalability and reduced latency, particularly when processing large data volumes. In some embodiments, the application of weighting functions 156 determined by a priority machine-learning model may provide an additional technical benefit by dynamically adjusting critical values associated with graph nodes 148 in response to learned priorities. This adaptive mechanism may improve the accuracy and stability of alignment scoring by allowing the system to emphasize key features and filter out noise or inconsistencies in the input data. Consequently, the apparatus 100 may achieve faster convergence and greater robustness in real-world operating conditions involving incomplete or unstructured textual inputs. In some embodiments, the disclosed graphical user interface 172 may further provide a technical improvement in human-computer interaction by rendering alignment results as interactive graphical elements. The interface may enable real-time feedback and recalibration of weighting parameters, thereby supporting dynamic model refinement without interrupting system operation. Accordingly, the disclosed embodiments may provide a technical solution to the technical problem of inefficient, inaccurate, and computationally expensive mapping of unstructured text data. By employing contextual embedding, graph-based data representation, and adaptive model weighting, the apparatus may achieve enhanced computational performance, increased processing efficiency, and improved interpretability of AI-driven data mapping operations.

Figure 2:
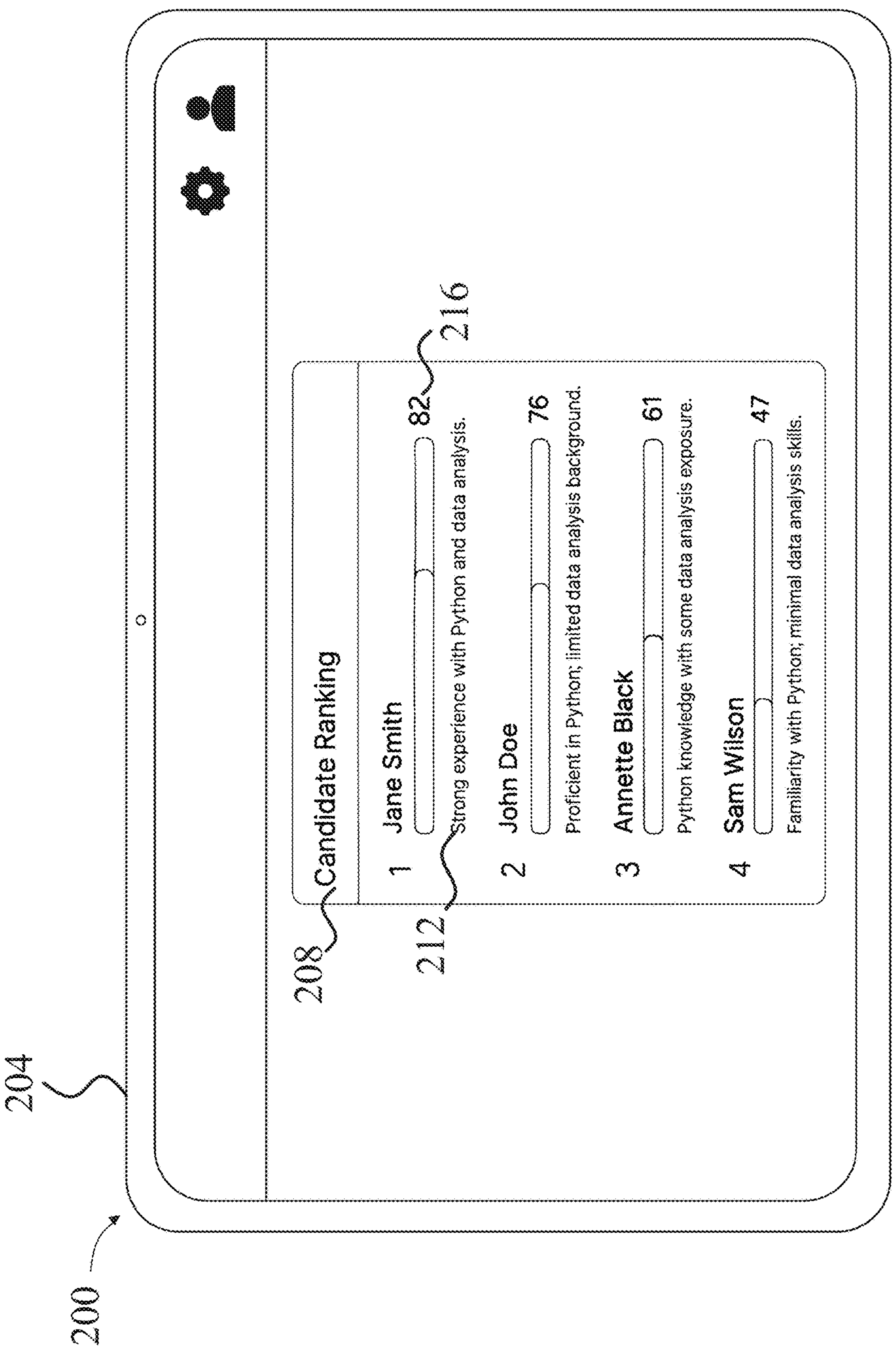
FIG. 2 illustrates an exemplary user interface.

Referring now to FIG. 2, an exemplary user interface 200 is illustrated. User interface 200 may be rendered on a user device 204 and display data output, such as data output 164, generated by a processor, such as processor 104. User interface 200 may display ranked list 208, breakdown texts 212, and alignment scores 216 corresponding to a plurality of candidates. Ranked list 208 may display the plurality of candidates in descending order of their alignment scores 216. Each entry in the ranked list 208 may be associated with one or more alignment scores 216 and corresponding breakdown texts 212. In some cases, breakdown texts 212 may provide natural language explanations describing the factors influencing each candidate's ranking, including comparative strengths or areas of deficiency relative to the role data. Breakdown texts 212 may be generated dynamically by a language model configured to interpret alignment score components to produce contextually accurate summaries. In some cases, alignment scores 216 may be represented as numerical indicators and graphical progress bars to provide a clear visualization of relative candidate performance. In some embodiments, user interface 200 may include interactive graphical elements, allowing a user to select, expand, or reorder portions of the ranked list 208 for additional analysis. In some cases, user interface 200 may be configured to receive user feedback corresponding to one or more visual indicators. The feedback may be transmitted to processor, which may adjust one or more weighting functions as a function of the received feedback, thereby refining future alignment score computations and improving ranking precision over time.

Figure 3:
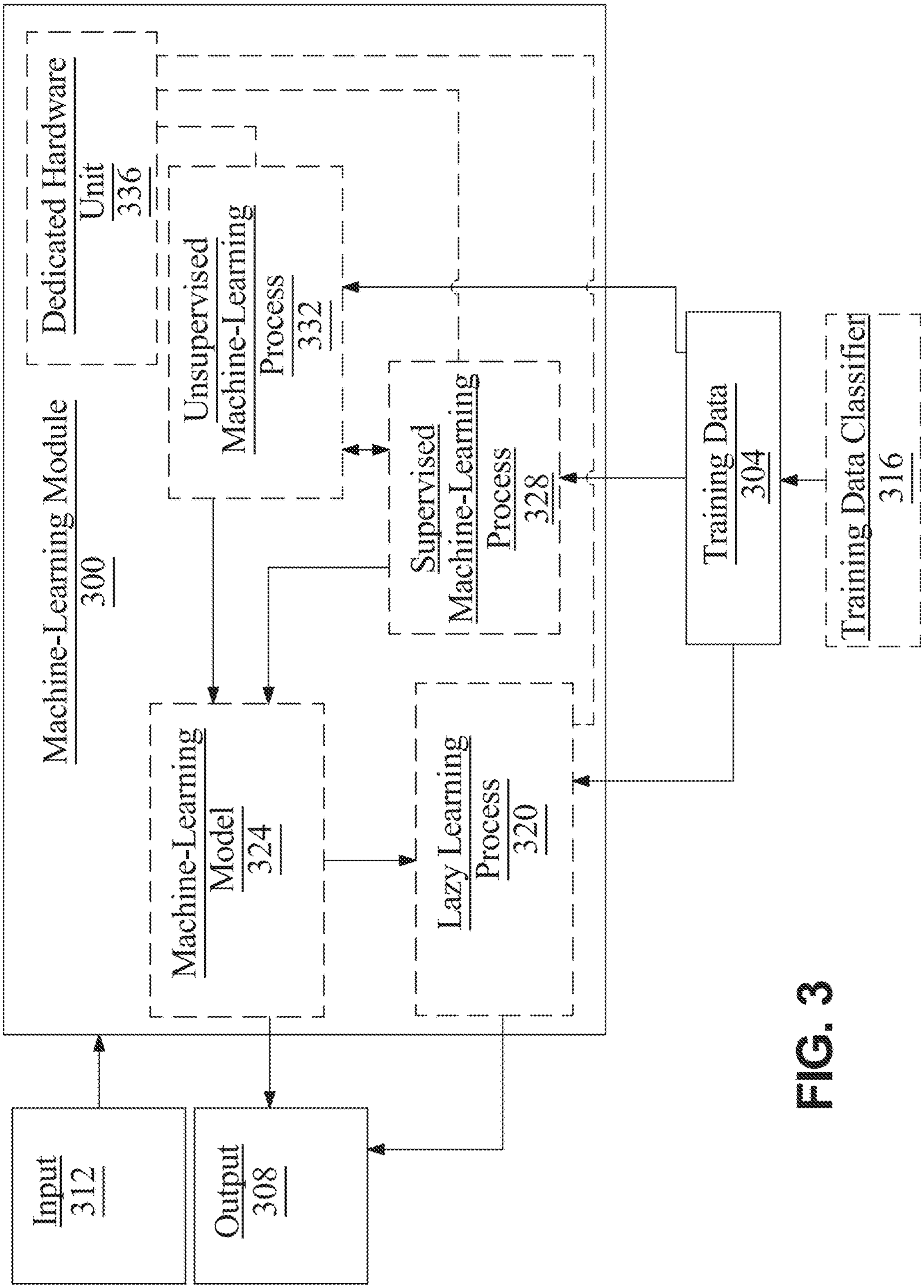
FIG. 3 illustrates a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include first dataset, candidate data, second dataset, role data, and the like. As a non-limiting illustrative example, output data may include embedding representation, alignment score, structured graph, data output, ranked list, breakdown texts, and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to candidate cohort related to candidate's demographic, location, skill, experience, and the like. As a non-limiting example, training data classifier 316 may classify elements of training data to user cohort related to user's industry field, organization size, and the like.

Still referring to FIG. 3, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A)P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute 1 as derived using a Pythagorean norm:

$$1 = \sqrt{\sum_{i=0}^{n} a_1^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include first dataset, candidate data, second dataset, role data, and the like as described above as inputs, embedding representation, alignment score, structured graph, data output, ranked list, breakdown texts, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation, gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
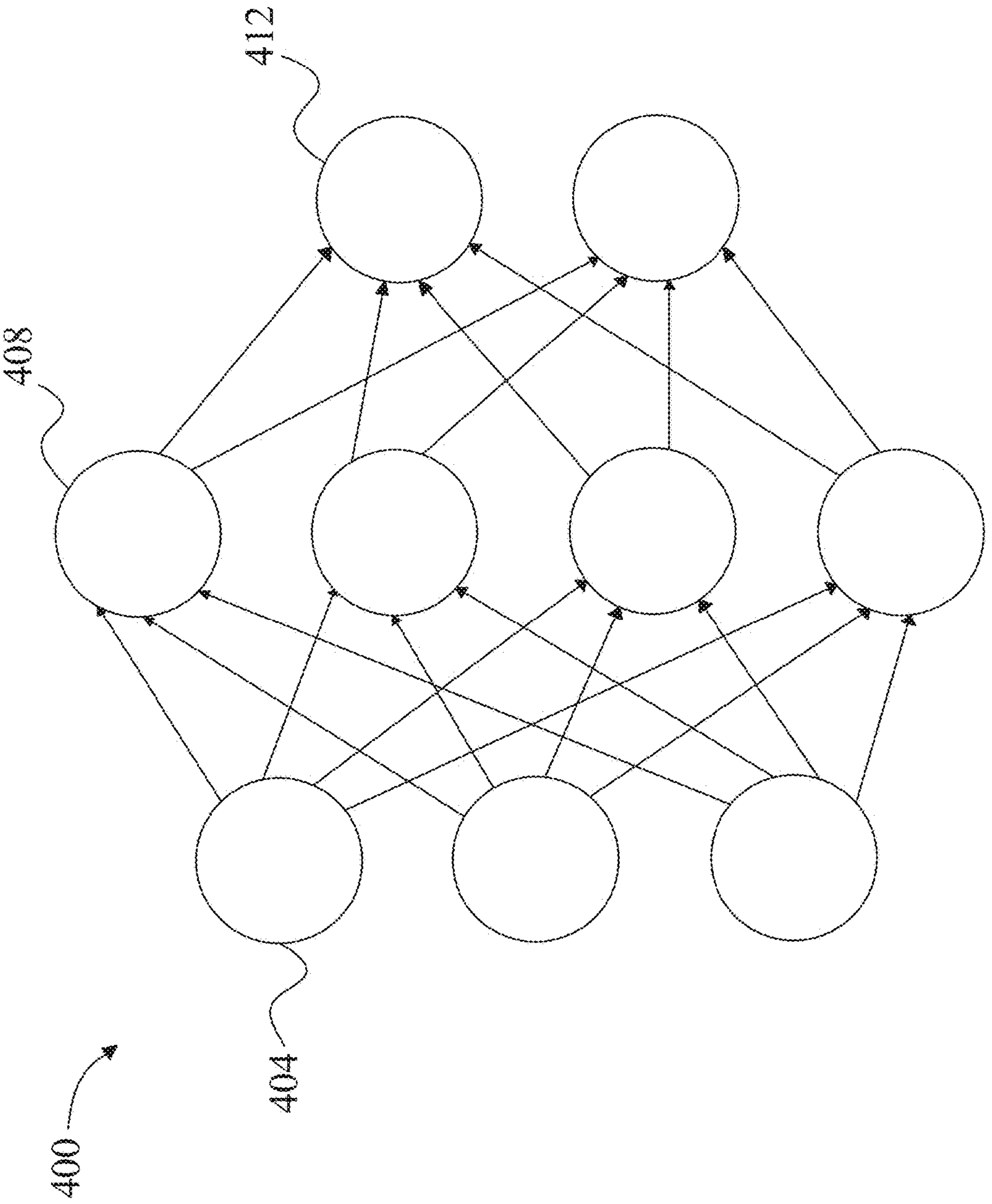
FIG. 4 illustrates a diagram of an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
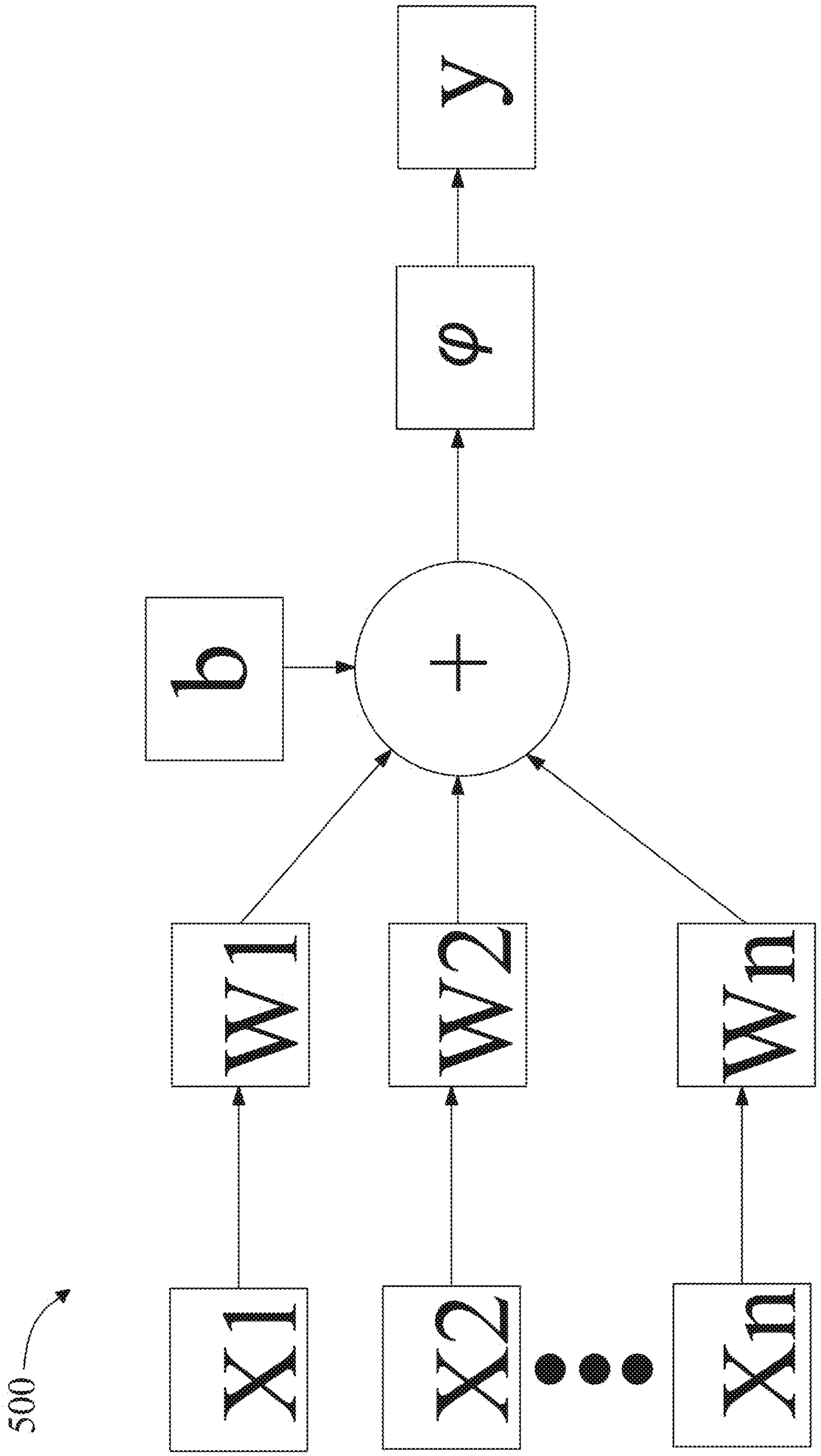
FIG. 5 illustrates a block diagram of an exemplary node in a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function q, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dw}$$

where $w_{new}$ is the updated weight value, $w_{old}$ is the previous weight value, α is a parameter to set the learning rate, and $$\frac{dJ}{dw}$$

is the partial derivative of with respect to weight w.

Figure 6:
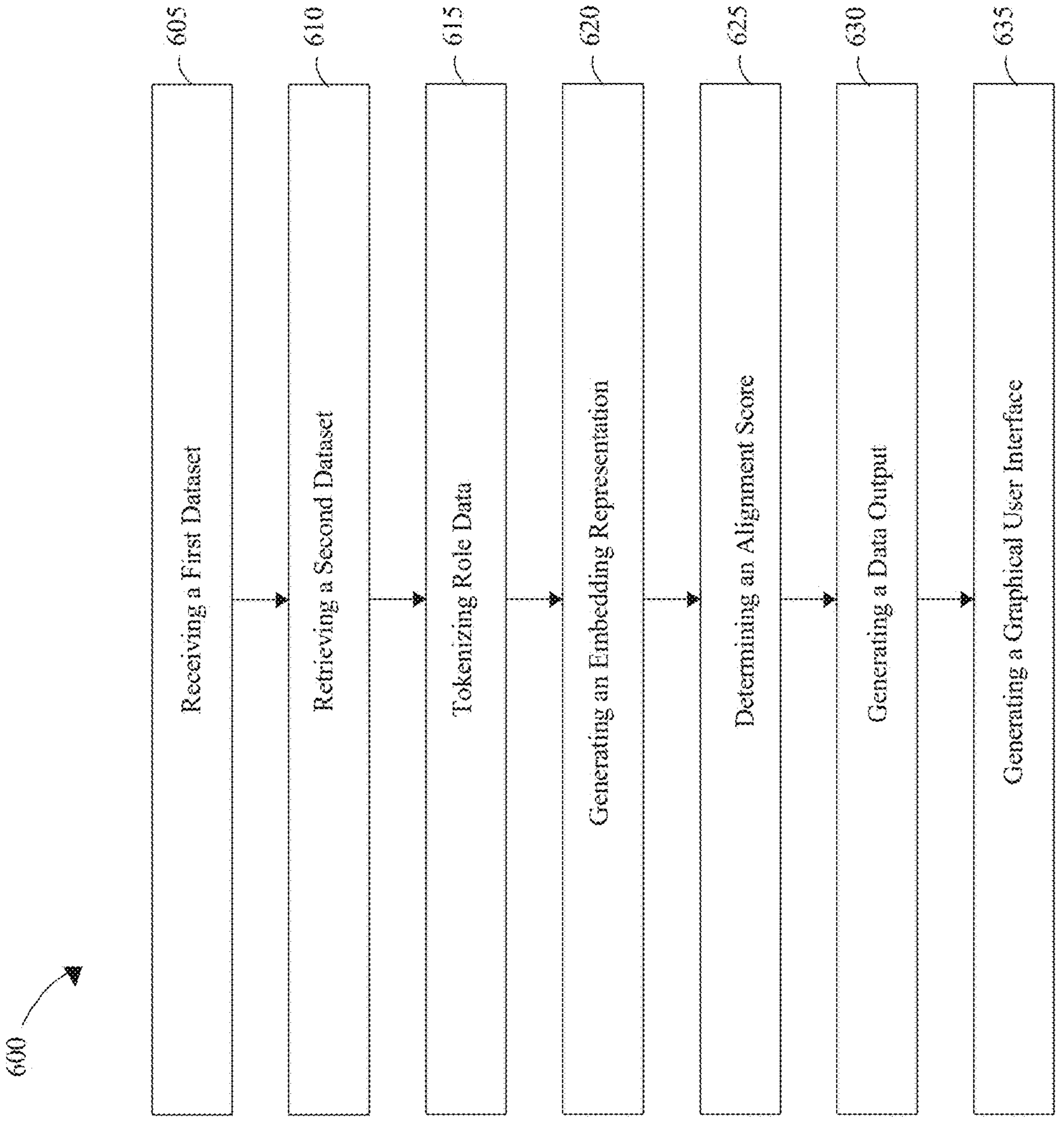
FIG. 6 illustrates a flow diagram of an exemplary method of vector-based data mapping.

Referring now to FIG. 6, a flow diagram of an exemplary method 600 of vector-based data mapping is illustrated. Method 600 contains a step 605 of receiving, using at least a processor, a first dataset including candidate data associated with a plurality of candidates. This may be implemented as disclosed herein and with reference to FIGS. 1-5.

With continued reference to FIG. 6, method 600 contains a step 610 of retrieving, using at least a processor, a second dataset from one or more data sources, wherein the second dataset includes role data. This may be implemented as disclosed herein and with reference to FIGS. 1-5.

With continued reference to FIG. 6, method 600 contains a step 615 of tokenizing, using at least a processor, role data into a structured graph including a plurality of graph nodes and at least one relationship edge between the plurality of graph nodes. In some embodiments, tokenizing the role data into the structured graph may include identifying at least a skill term from the role data using a language processing module, and associating the at least a skill term with at least one contextual modifier, wherein the plurality of graph nodes may include the at least one contextual modifier. In some embodiments, tokenizing the role data may include identifying a plurality of skill expressions within the role data using a language processing module, classifying the plurality of skill expressions into one or more skill categories, and generating the at least one relationship edge between the plurality of graph nodes as a function of co-occurrence frequency between the one or more skill categories. In some embodiments, generating the at least one relationship edge may include generating the at least one relationship edge between the plurality of graph nodes as a function of hierarchical dependency between the one or more skill categories. These may be implemented as disclosed herein and with reference to FIGS. 1-5.

With continued reference to FIG. 6, method 600 contains a step 620 of generating, using the at least a processor, an embedding representation of candidate data. In some embodiments, generating the embedding representation may include generating the embedding representation of the candidate data using a transformer-based natural language processing model that has been trained on domain-specific textual data. In some embodiments, generating the embedding representation may include training the transformer-based natural language processing model using a stochastic gradient descent algorithm configured to iteratively optimize an objective function representing statistical estimations of relationships between terms within training data, and defining the objective function as a sum of the relationships to be estimated between input terms and output terms. These may be implemented as disclosed herein and with reference to FIGS. 1-5.

With continued reference to FIG. 6, method 600 contains a step 625 of determining, using at least a processor, an alignment score for each candidate of a plurality of candidates by determining vector similarity between an embedding representation and a structured graph, wherein determining the alignment score includes applying one or more weighting functions to the scaled alignment scores of the plurality of candidates as a function of a critical value associated with the plurality of graph nodes, wherein applying the one or more weighting functions scaling the scaled alignment scores in proportion to the one or more weighting functions. In some embodiments, applying the one or more weighting functions may include determining a model-learned priority as a function of the role data using a priority machine-learning model configured to identify a priority pattern within the role data, and assigning the critical value to each graph node as a function of the model-learned priority. These may be implemented as disclosed herein and with reference to FIGS. 1-5.

With continued reference to FIG. 6, method 600 contains a step 630 of generating, using at least a processor, a data output as a function of scaled alignment scores of a plurality of candidates, wherein the data output includes a ranked list of the plurality of candidates and corresponding breakdown texts. In some embodiments, generating the data output may include generating the corresponding breakdown texts using a language model configured to generate natural language explanations of the scaled alignment scores, wherein the language model may include a large language model. These may be implemented as disclosed herein and with reference to FIGS. 1-5.

With continued reference to FIG. 6, method 600 contains a step 635 of generating, using at least a processor, a graphical user interface including a data output. In some embodiments, generating the graphical user interface may include generating a plurality of visual indicators of the scaled alignment scores as interactive graphical elements. In some embodiments, generating the graphical user interface may include receiving feedback data in response to the plurality of visual indicators, and updating the one or more weighting functions as a function of the feedback data, wherein updating the one or more weighting functions may include adjusting the critical value associated with the plurality of graph nodes as a function of the feedback data. These may be implemented as disclosed herein and with reference to FIG. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
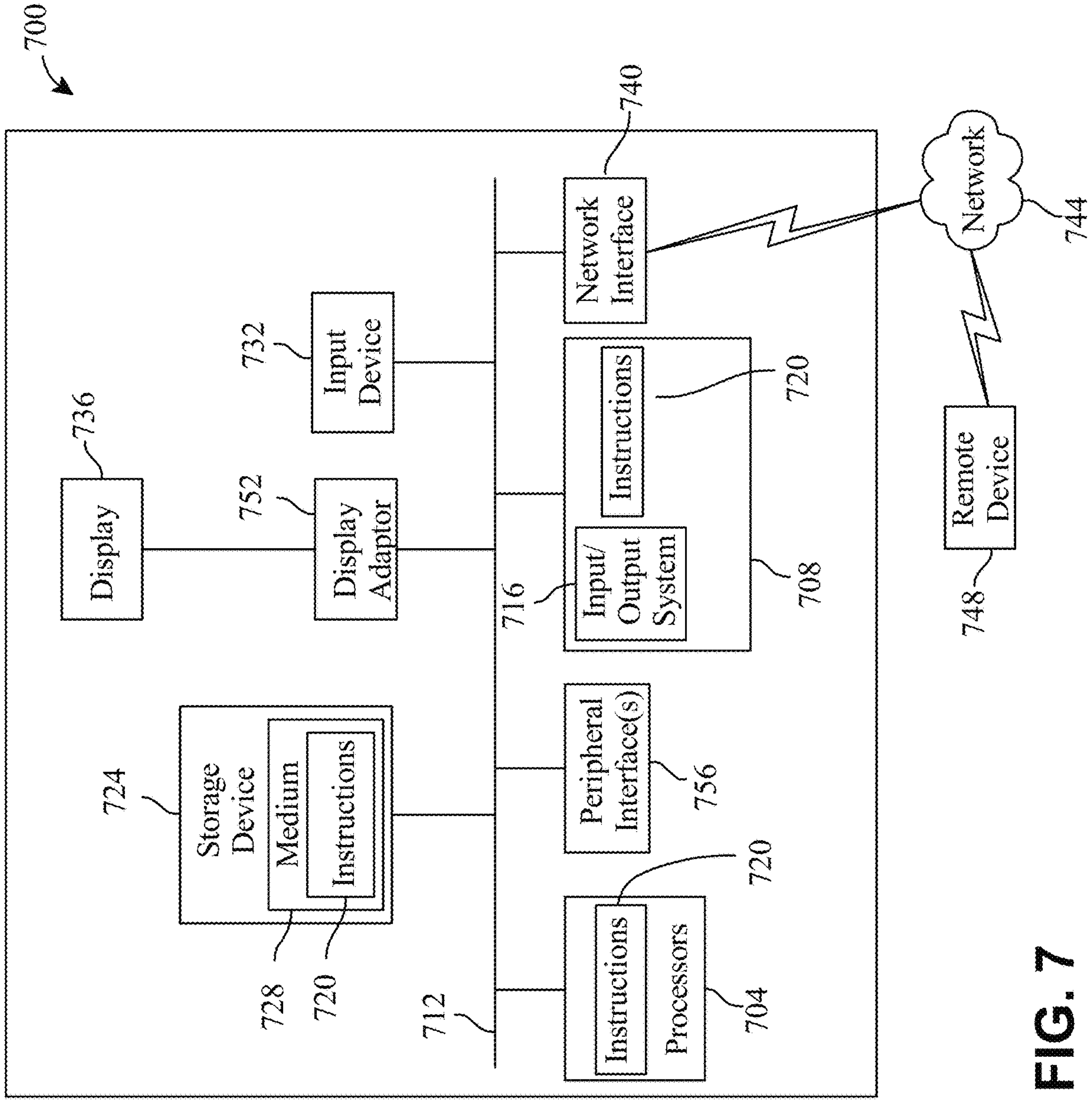
FIG. 7 illustrates a block diagram of a computing system that can be used to implement any one or more of the methodologies disclosed herein and any one or more portions thereof. The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulpo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof. Memory 708 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In some embodiments, storage device 724 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or more remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

Further referring to FIG. 7, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 7, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 7, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 700, processor 704, and memory 708 may be virtualized; that is, a virtual machine and/or container may interact directly with such computing system 700, processor 704, and/or memory 708, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 704 comprises a plurality of processors and/or processor cores, virtualization may, in some cases, simulate or emulate a single (virtual) processor whose functions are allocated to one or more of the plurality of processors and/or processor cores. In this case, while processor 704 may be said to be virtualized, the processor 704, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU; (2) VMware by Broadcom Inc of Palo Alto, California; (3) VirtualBox by Oracle Corporation headquartered in Austin, Texas; and (4) kernel-based virtual machine (KVM).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for vector-based data mapping, the apparatus comprising:

at least a processor; and a memory communicatively connected to the at least a processor, wherein the memory contains instructions configuring the at least a processor to:

receive a first dataset comprising candidate data associated with a plurality of candidates;

retrieve a second dataset from one or more data sources, wherein the second dataset comprises role data;

tokenize the role data into a structured graph comprising a plurality of graph nodes and at least one relationship edge between the plurality of graph nodes;

generate an embedding representation of the candidate data;

determine, for each candidate of the plurality of candidates, an alignment score by determining vector similarity between the embedding representation and the structured graph, wherein determining the alignment score comprises:

determining, for at least a subset of the plurality of graph nodes, a node-specific similarity sub-score representing a similarity between at least a portion of the embedding representation and a respective graph node; and applying one or more weighting functions to the alignment scores of the plurality of candidates as a function of a critical value associated with respective graph nodes, wherein:

the critical value modulates the node-specific similarity sub-score prior to aggregation into the alignment score of a corresponding candidate of the plurality of candidates; and applying the one or more weighting functions comprises scaling the alignment scores in proportion to the one or more weighting functions;

generate a data output as a function of the scaled alignment scores of the plurality of candidates, wherein the data output comprises a ranked list of the plurality of candidates and corresponding breakdown texts; and generate a graphical user interface comprising the data output.

2. The apparatus of claim 1, wherein tokenizing the role data into the structured graph comprises:

identifying at least a skill term from the role data using a language processing module; and associating the at least a skill term with at least one contextual modifier, wherein the plurality of graph nodes comprises the at least one contextual modifier.

3. The apparatus of claim 1, wherein tokenizing the role data comprises:

identifying a plurality of skill expressions within the role data using a language processing module;

classifying the plurality of skill expressions into one or more skill categories; and generating the at least one relationship edge between the plurality of graph nodes as a function of co-occurrence frequency between the one or more skill categories.

4. The apparatus of claim 3, wherein generating the at least one relationship edge comprises generating the at least one relationship edge between the plurality of graph nodes as a function of hierarchical dependency between the one or more skill categories.

5. The apparatus of claim 1, wherein generating the embedding representation comprises generating the embedding representation of the candidate data using a transformer-based natural language processing model that has been trained on domain-specific textual data.

6. The apparatus of claim 5, wherein generating the embedding representation comprises:

training the transformer-based natural language processing model using a stochastic gradient descent algorithm configured to iteratively optimize an objective function representing statistical estimations of relationships between terms within training data; and defining the objective function as a sum of the relationships to be estimated between input terms and output terms.

7. The apparatus of claim 1, wherein applying the one or more weighting functions comprises:

determining a model-learned priority as a function of the role data using a priority machine-learning model configured to identify a priority pattern within the role data; and assigning the critical value to each graph node as a function of the model-learned priority.

8. The apparatus of claim 1, wherein generating the data output comprises generating the corresponding breakdown texts using a language model configured to generate natural language explanations of the scaled alignment scores, wherein the language model comprises a large language model.

9. The apparatus of claim 1, wherein generating the graphical user interface comprises generating a plurality of visual indicators of the scaled alignment scores as interactive graphical elements.

10. The apparatus of claim 9, wherein generating the graphical user interface comprises:

receiving feedback data in response to the plurality of visual indicators; and updating the one or more weighting functions as a function of the feedback data, wherein updating the one or more weighting functions comprises adjusting the critical value associated with the plurality of graph nodes as a function of the feedback data.

11. A method of vector-based data mapping, the method comprising:

receiving, using at least a processor, a first dataset comprising candidate data associated with a plurality of candidates;

retrieving, using the at least a processor, a second dataset from one or more data sources, wherein the second dataset comprises role data;

tokenizing, using the at least a processor, the role data into a structured graph comprising a plurality of graph nodes and at least one relationship edge between the plurality of graph nodes;

generating, using the at least a processor, an embedding representation of the candidate data;

determining, using the at least a processor, an alignment score for each candidate of the plurality of candidates by determining vector similarity between the embedding representation and the structured graph, wherein determining the alignment score comprises:

determining, for at least a subset of the plurality of graph nodes, a node-specific similarity sub-score representing a similarity between at least a portion of the embedding representation and a respective graph node; and applying one or more weighting functions to the alignment scores of the plurality of candidates as a function of a critical value associated with respective graph nodes, wherein;

the critical value modulates the node-specific similarity sub-score prior to aggregation into the alignment score of a corresponding candidate of the plurality of candidates; and applying the one or more weighting functions comprises scaling the scaled alignment scores in proportion to the one or more weighting functions;

generating, using the at least a processor, a data output as a function of the scaled alignment scores of the plurality of candidates, wherein the data output comprises a ranked list of the plurality of candidates and corresponding breakdown texts; and generating, using the at least a processor, a graphical user interface comprising the data output.

12. The method of claim 11, wherein tokenizing the role data into the structured graph comprises:

identifying at least a skill term from the role data using a language processing module; and associating the at least a skill term with at least one contextual modifier, wherein the plurality of graph nodes comprises the at least one contextual modifier.

13. The method of claim 11, wherein tokenizing the role data comprises:

identifying a plurality of skill expressions within the role data using a language processing module;

classifying the plurality of skill expressions into one or more skill categories; and generating the at least one relationship edge between the plurality of graph nodes as a function of co-occurrence frequency between the one or more skill categories.

14. The method of claim 13, wherein generating the at least one relationship edge comprises generating the at least one relationship edge between the plurality of graph nodes as a function of hierarchical dependency between the one or more skill categories.

15. The method of claim 11, wherein generating the embedding representation comprises generating the embedding representation of the candidate data using a transformer-based natural language processing model that has been trained on domain-specific textual data.

16. The method of claim 15, wherein generating the embedding representation comprises:

training the transformer-based natural language processing model using a stochastic gradient descent algorithm configured to iteratively optimize an objective function representing statistical estimations of relationships between terms within training data; and defining the objective function as a sum of the relationships to be estimated between input terms and output terms.

17. The method of claim 11, wherein applying the one or more weighting functions comprises:

determining a model-learned priority as a function of the role data using a priority machine-learning model configured to identify a priority pattern within the role data; and assigning the critical value to each graph node as a function of the model-learned priority.

18. The method of claim 11, wherein generating the data output comprises generating the corresponding breakdown texts using a language model configured to generate natural language explanations of the scaled alignment scores, wherein the language model comprises a large language model.

19. The method of claim 11, wherein generating the graphical user interface comprises generating a plurality of visual indicators of the scaled alignment scores as interactive graphical elements.

20. The method of claim 19, wherein generating the graphical user interface comprises:

receiving feedback data in response to the plurality of visual indicators; and updating the one or more weighting functions as a function of the feedback data, wherein updating the one or more weighting functions comprises adjusting the critical value associated with the plurality of graph nodes as a function of the feedback data.

* * * * *